(12) United States Patent
Ukai et al.

(10) Patent No.: US 11,839,925 B2
(45) Date of Patent: Dec. 12, 2023

(54) RECIPROCATING CUTTING TOOL

(71) Applicant: MAKITA CORPORATION, Anjo (JP)

(72) Inventors: Tomohiro Ukai, Anjo (JP); Yuki Miwa, Anjo (JP)

(73) Assignee: MAKITA CORPORATION, Anjo (JP)

(*) Notice: Subject to any disclaimer, the term of this patent is extended or adjusted under 35 U.S.C. 154(b) by 33 days.

(21) Appl. No.: 17/856,282

(22) Filed: Jul. 1, 2022

(65) Prior Publication Data
US 2023/0027158 A1 Jan. 26, 2023

(30) Foreign Application Priority Data

Jul. 21, 2021 (JP) ................... 2021-120885

(51) Int. Cl.
*B23D 51/16* (2006.01)
*B23D 51/00* (2006.01)

(52) U.S. Cl.
CPC ............. *B23D 51/16* (2013.01); *B23D 51/00* (2013.01)

(58) Field of Classification Search
CPC ................................ B23D 51/16; B23D 51/00
See application file for complete search history.

(56) References Cited

U.S. PATENT DOCUMENTS

| | | | | |
|---|---|---|---|---|
| 7,424,779 B2* | 9/2008 | Tozawa | ................... | B23D 51/00 30/392 |
| 8,230,607 B2* | 7/2012 | Limberg | ................ | B23D 51/10 279/81 |
| 9,156,097 B2* | 10/2015 | Neitzell | ................. | B23D 51/10 |
| 11,065,698 B2* | 7/2021 | Cholst | ..................... | B27B 19/00 |
| 2001/0011420 A1* | 8/2001 | Osada | .................. | B23D 49/165 30/392 |
| 2005/0246905 A1* | 11/2005 | Tozawa | .................. | B23D 51/00 30/392 |
| 2009/0277022 A1* | 11/2009 | Limberg | ................ | B23D 51/10 279/81 |

* cited by examiner

*Primary Examiner* — Sean M Michalski
(74) *Attorney, Agent, or Firm* — Oliff PLC

(57) ABSTRACT

A reciprocating cutting tool reduces deteriorating movement of an operating drum due to entry of chips between the operating drum and a housing. A reciprocating cutting tool includes a motor, a slider being rod-like and extending in a front-rear direction, a reciprocation converter that converts rotation of the motor to reciprocation in the front-rear direction and transmits the reciprocation to the slider, a power transmission housing accommodating the reciprocation converter, a tip tool holder at a front end of the slider to detachably receive a tip tool, and an operating drum operable to attach or detach the tip tool with the tip tool holder through rotation. The operating drum is rotatably held on the power transmission housing with one or more ring members.

20 Claims, 14 Drawing Sheets

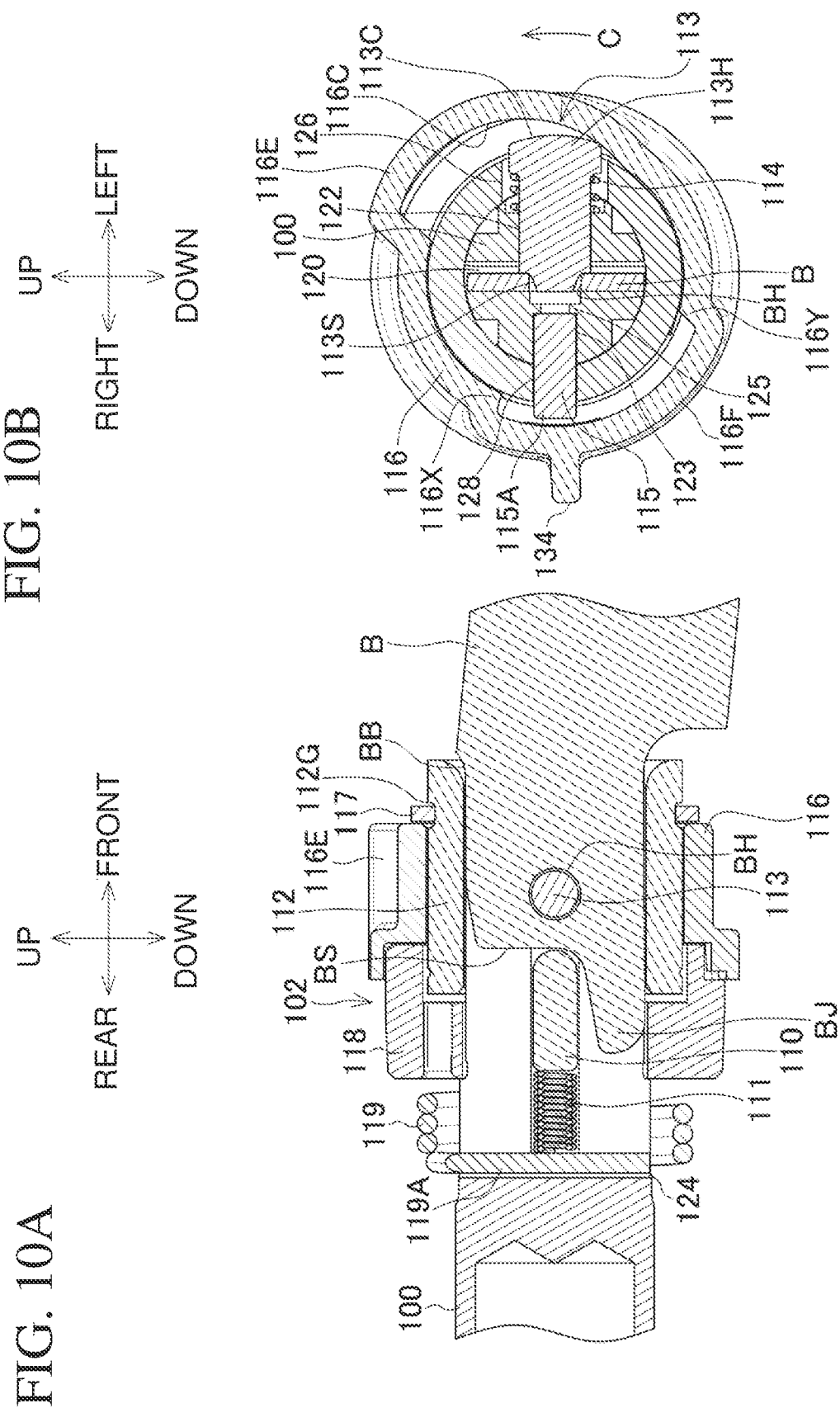

FIG. 14
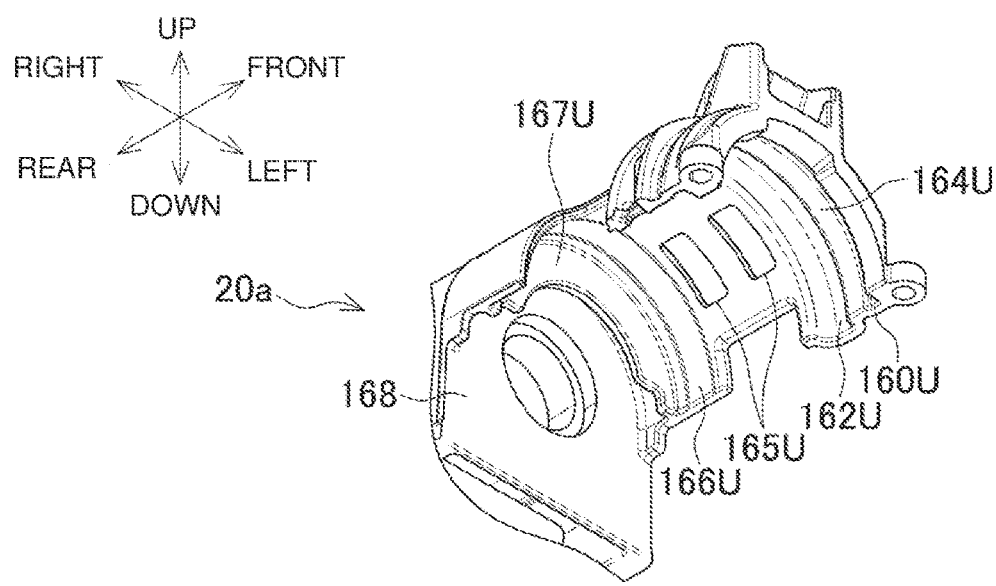
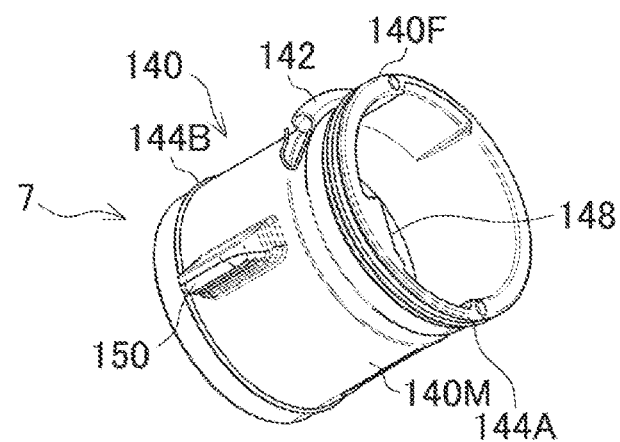
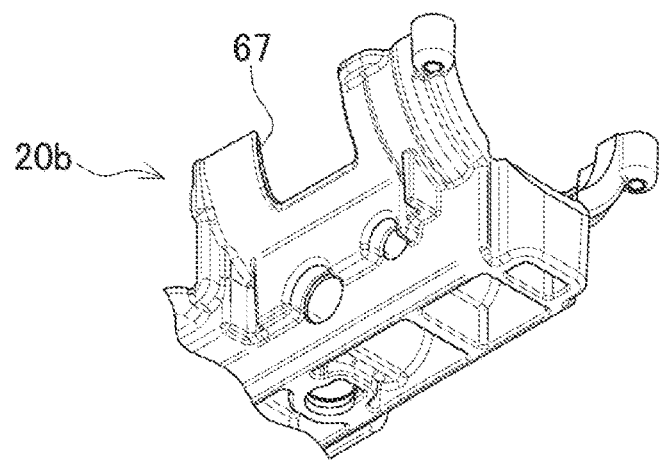

RECIPROCATING CUTTING TOOL

CROSS-REFERENCE TO RELATED APPLICATIONS

This application claims the benefit of priority to Japanese Patent Application No. 2021-120885, filed on Jul. 21, 2021, the entire contents of which are hereby incorporated by reference.

BACKGROUND

1. Technical Field

The present disclosure relates to a reciprocating cutting tool such as a rechargeable reciprocating saw.

2. Description of the Background

A reciprocating tool 10 described in U.S. Pat. No. 8,230,607 includes a sleeve 138 (operating drum) rotatable in a housing 14 for detaching a blade.

BRIEF SUMMARY

One or more aspects of the present disclosure are directed to a reciprocating cutting tool that reduces deteriorating movement of an operating drum due to entry of chips between the operating drum and a housing.

A first aspect of the present disclosure provides a reciprocating cutting tool, including:
- a motor;
- a slider being rod-like, the slider extending in a front-rear direction;
- a reciprocation converter configured to convert rotation of the motor to reciprocation in the front-rear direction and transmit the reciprocation to the slider;
- a power transmission housing accommodating the reciprocation converter;
- a tip tool holder at a front end of the slider, the tip tool holder being configured to detachably receive a tip tool; and
- an operating drum operable to attach or detach the tip tool with the tip tool holder through rotation, the operating drum being rotatably held on the power transmission housing with one or more ring members.

The reciprocating cutting tool according to the above aspect of the present disclosure reduces deteriorating movement of the operating drum.

BRIEF DESCRIPTION OF DRAWINGS

FIG. 10A is a longitudinal central sectional view of the blade holder in the slider in FIG. 6 in a blade attached state.

FIG. 10B is a cross-sectional view of the holder pin in the blade holder in the slider in FIG. 6 in the blade attached state.

FIG. 14 is an exploded perspective view of the front part of the upper power transmission housing, the release unit, and the front part of the lower power transmission housing of the reciprocating saw in FIG. 1 as viewed from below.

DETAILED DESCRIPTION

Embodiments and modifications of the present disclosure will now be described with reference to the drawings as appropriate.

A reciprocating cutting tool according to the embodiments includes, for example, a power tool or a reciprocating tool, or more specifically, a reciprocating saw.

The directional terms such as front, rear, up, down, right, and left in the embodiments and the modifications are defined for ease of explanation, and may be changed depending on, for example, at least the operating situations or the status of a movable member.

Figure 1:
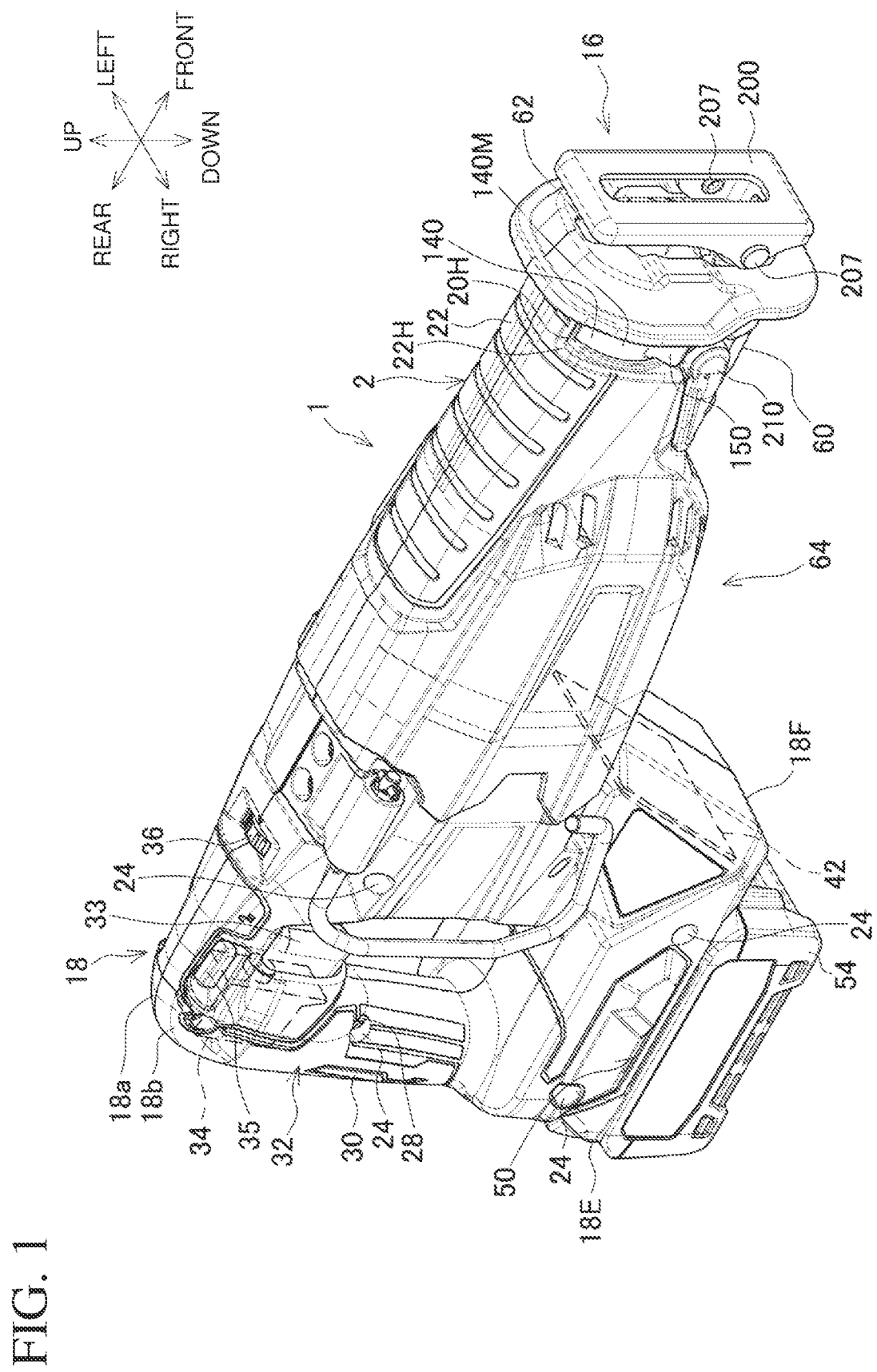
FIG. 1 is a perspective view of a reciprocating saw as viewed from the upper right front.
Figure 2:
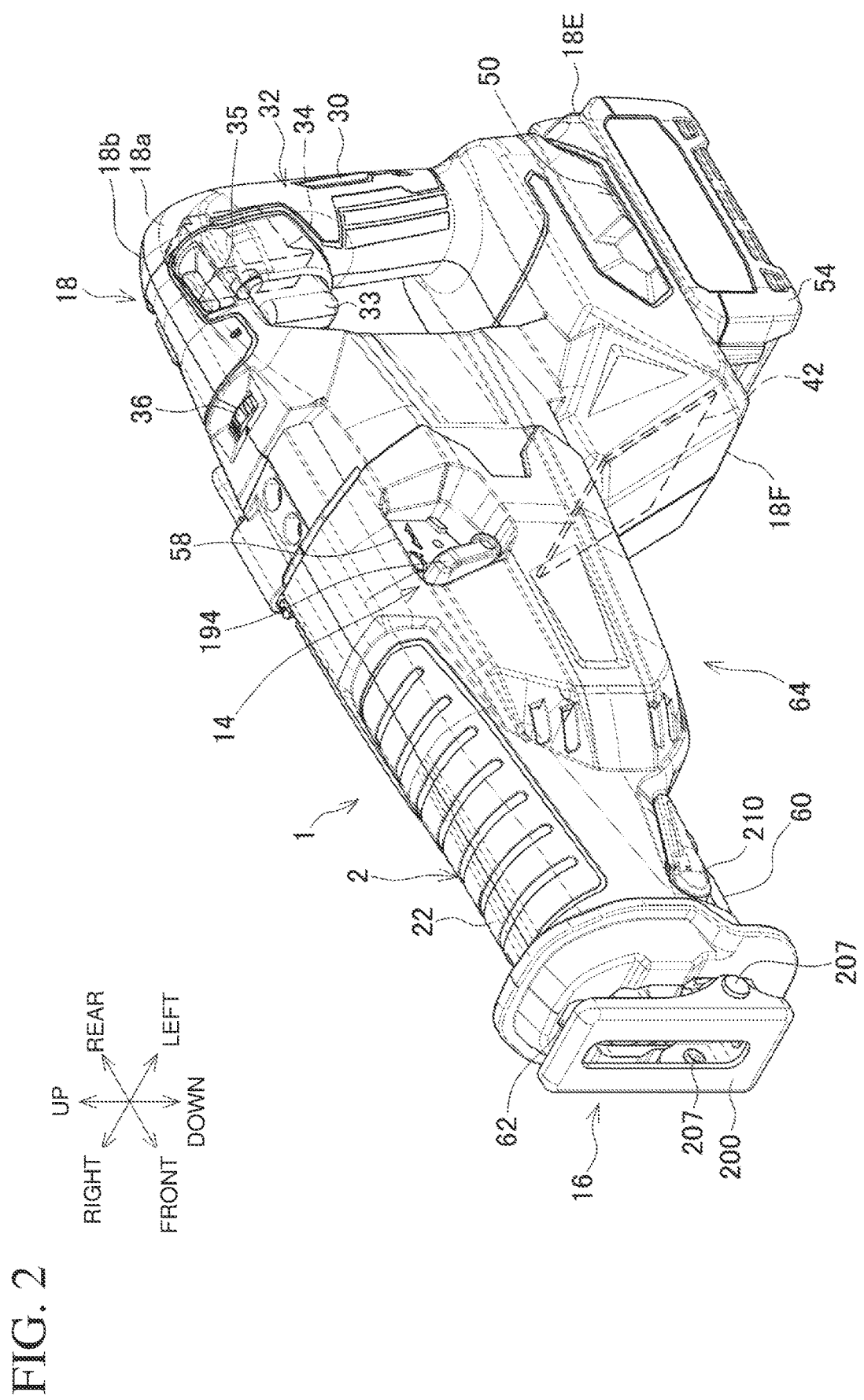
FIG. 2 is a perspective view of the reciprocating saw as viewed from the upper left front.
Figure 3:
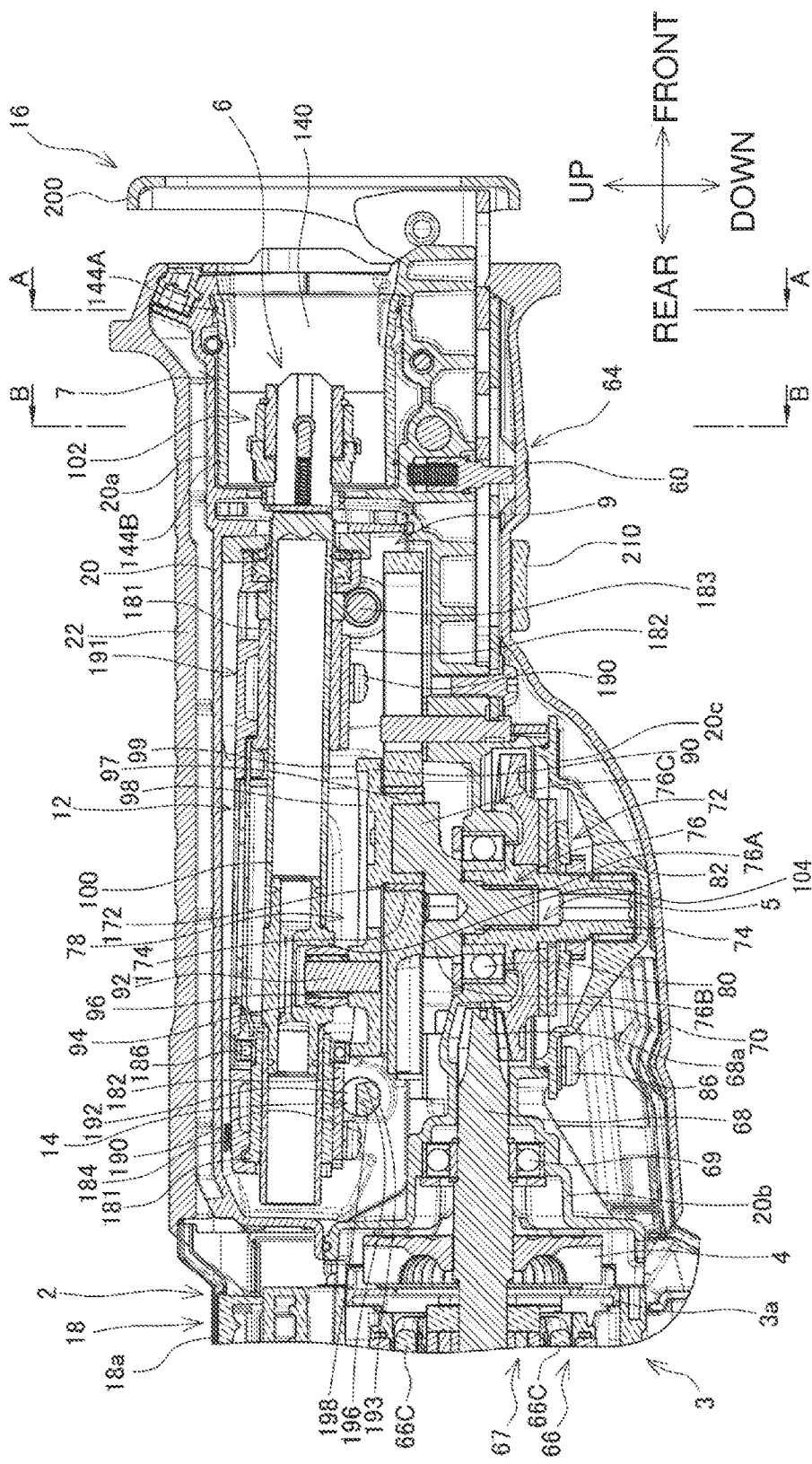
FIG. 3 is a longitudinal central sectional view of a front part in FIG. 1.
Figure 4:
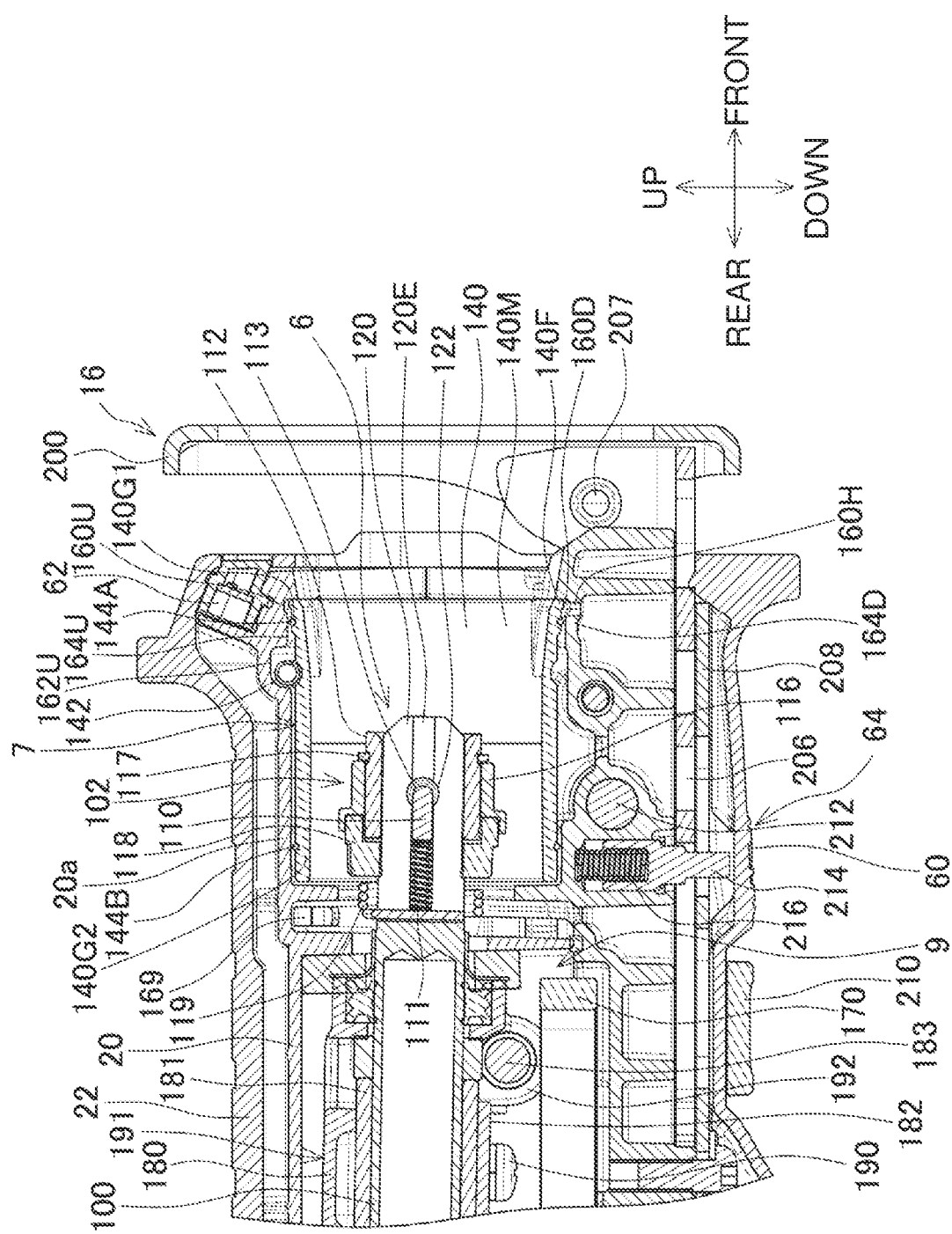
FIG. 4 is a longitudinal central sectional view of the front part in FIG. 3.

FIG. 1 is a perspective view of a reciprocating saw 1 as viewed from the upper right front. FIG. 2 is a perspective view of the reciprocating saw 1 as viewed from the upper left front. FIG. 3 is a longitudinal central sectional view of a front part in FIG. 1. FIG. 4 is a longitudinal central sectional view of the front part in FIG. 3.

The reciprocating saw 1 includes a body housing 2, a motor 3, a fan 4, a reciprocation converter 5, a slider 6 as an output section, a release unit 7, a counterweight 9, an orbital unit 12, an orbital switcher 14, and a guide shoe 16.

The body housing 2 is a support frame that directly or indirectly holds the components.

The body housing 2 includes a half housing 18, a power transmission housing 20, and a cover 22.

The half housing 18 has a cylindrical front portion. The half housing 18 has a looped rear portion. The half housing 18 is formed from plastic.

The half housing 18 holds the motor 3 in its upper front portion. The half housing 18 includes a motor compartment 18M. The motor compartment 18M accommodates the motor 3.

The motor 3 includes a motor case 3a. The motor case 3a defines an outer wall of the motor 3. The motor case 3a is cylindrical. The motor case 3a has an open front portion. The half housing 18 is connected to the power transmission housing 20 with the motor case 3a.

The half housing 18 is halved into a left half housing 18a and a right half housing 18b.

The left half housing 18a includes multiple screw bosses (not shown). The right half housing 18b has multiple threaded holes 24. The threaded holes 24 are aligned with the screw bosses. Multiple screws 28 are placed through the screw bosses and the threaded holes 24 laterally, fastening the right half housing 18b to the left half housing 18a.

The half housing 18 includes a first grip 30 at its looped rear portion. The first grip 30 extends vertically. The first grip 30 is grippable by a user.

The half housing 18 may not be halved, but may be one piece, for example.

The first grip 30 holds a main switch 32 in its upper portion.

The main switch 32 includes a trigger 33 and a main switch body 34.

The trigger 33 is exposed at the upper front of the first grip 30. The user pulls the trigger 33 with a fingertip (to move the trigger 33 backward). The trigger 33 is in front of the main switch body 34. The trigger 33 is connected to the main switch body 34.

The main switch body 34 is located in the upper portion of the first grip 30. The main switch body 34 is turned on or off in response to an operation on the trigger 33. The main switch body 34 is turned on when the pull of the trigger 33 reaches or exceeds a predetermined amount. The main switch body 34 outputs a signal (e.g., a resistance) that varies in accordance with the pull reaching or exceeding the predetermined amount.

The trigger 33 turns on or off the motor 3 through the main switch body 34. The trigger 33 is a switch for turning on or off the motor 3.

A lock-off button 35 is located above the trigger 33. The lock-off button 35 is a laterally elongated plate.

The lock-off button 35 has its right and left portions exposed from the half housing 18. The lock-off button 35 is slidable rightward when the left portion is pressed. The lock-off button 35 is slidable leftward when the right portion is pressed.

The lock-off button 35 slid to a right position prevents the trigger 33 from being pulled. The motor 3 cannot be turned on in this state. The lock-off button 35 slid to a left position permits the trigger 33 to be pulled. The motor 3 can be turned on in this state.

A speed switching dial 36 is located in front of the lock-off button 35. The speed switching dial 36 is a rotatable disk extending vertically and laterally. The speed switching dial 36 has its upper portion exposed from the half housing 18.

The speed switching dial 36 outputs a signal corresponding to its rotational position (angle).

The half housing 18 holds a control circuit board 42 below the motor 3. The control circuit board 42 controls the motor 3. The control circuit board 42 includes at least a microcomputer or multiple (six or twelve) switching elements.

The control circuit board 42 extends diagonally, or more specifically, upward toward the front.

The half housing 18 has a lower rear portion 18E recessed upward relative to the lower front portion 18F of the half housing 18.

A battery mount 50 is located on the lower rear portion 18E of the half housing 18.

The battery mount 50 receives a battery 54 that is slid forward from the rear. The attached battery 54 is electrically connected to the motor 3 through the control circuit board 42. The battery 54 powers the motor 3.

The power transmission housing 20 supports the components of the reciprocation converter 5, the slider 6, the counterweight 9, the orbital unit 12, and the orbital switcher 14 directly or indirectly. The power transmission housing 20 accommodates the reciprocation converter 5. The power transmission housing 20 is formed from a metal. The power transmission housing 20 is connected to the front of the half housing 18.

The power transmission housing 20 is halved, and is a cylinder having openings in its front and rear ends. The power transmission housing 20 is formed from aluminum (including an aluminum alloy). The power transmission housing 20 accommodates the reciprocation converter 5. The power transmission housing 20 is thus also a converter housing. The power transmission housing 20 may be formed from a metal other than aluminum. The power transmission housing 20 is thus more robust.

The power transmission housing 20 includes an upper power transmission housing 20a, a lower power transmission housing 20b, and a bearing retainer 20c.

The upper power transmission housing 20a is fastened to the lower power transmission housing 20b with multiple screws (not shown) extending vertically.

The lower power transmission housing 20b has its rear end fastened to the front end of the half housing 18 with multiple screws (not shown) extending in a front-rear direction from the motor case 3a.

The cover 22 is cylindrical. The cover 22 is externally mounted on the power transmission housing 20. The cover 22 is an elastic member (rubber) and is located outside the power transmission housing 20 as a thermally or electrically insulating cover. The cover 22 may not be a component of the body housing 2. The cover 22 may be formed from plastic.

The rear end of the cover 22 covers the front end of the half housing 18. The cover 22 is continuous with the half housing 18 on the outer surface.

The cover 22 has an orbital switching lever hole 58 in its left rear portion (FIG. 2). The orbital switching lever hole 58 extends in the vertical and front-rear directions.

A lower portion of the cover 22, or more specifically, a front portion of the body housing 2 serves as a second grip 60. The second grip 60 is grippable by a user.

At least the number of sections in the body housing 2, the size of each section in the body housing 2, or the shape of each section in the body housing 2 may be modified variously. For example, the half housing 18 may include, at its rear, a handle housing separate from the half housing 18. The battery mount 50 may be separate from the half housing 18.

A lamp 62 is located between an upper front portion of the power transmission housing 20 and an upper front portion of the cover 22. The lamp 62 includes a light-emitting diode (LED) board. The LED board receives an LED.

The lamp 62 emits light forward. The lamp 62 can illuminate the area around the cutting position ahead of the slider 6.

The motor 3, the main switch body 34, the speed switching dial 36, and the lamp 62 each are electrically connected to the control circuit board 42 with multiple lead wires (not shown).

The portion of the half housing 18 holding the motor 3 (a portion outside the motor 3), the power transmission housing 20, the components held by these housings, and the cover 22 are included in a body 64 of the reciprocating saw 1.

The motor 3 is an electric motor. The motor 3 is a brushless motor. The motor 3 is driven with direct current (DC).

The motor 3 includes the motor case 3a, a stator 66, and a rotor 67.

The motor case 3a is held on the half housing 18.

The stator 66 is cylindrical. The stator 66 includes multiple (six) coils 66C.

The rotor 67 is located inside the stator 66. The motor 3 is an inner-rotor motor.

The rotor 67 includes a motor shaft 68.

The motor shaft 68 is cylindrical and extends in the front-rear direction. The motor shaft 68 is formed from a metal. The motor shaft 68 rotates about its axis. The motor shaft 68 has its front end extending into the rear end of the power transmission housing 20. The motor shaft 68 receives a pinion gear 68a on its front end. The pinion gear 68a includes multiple teeth.

A motor front bearing 69 is located behind the pinion gear 68a. The motor front bearing 69 surrounds a front portion of the motor shaft 68. The motor front bearing 69 supports the motor shaft 68 in a manner rotatable about the axis.

The motor front bearing 69 is held on a rear portion of the lower power transmission housing 20b.

A motor rear bearing (not shown) surrounds the rear end of the motor shaft 68. The motor rear bearing supports the motor shaft 68 in a manner rotatable about the axis. The motor rear bearing is held on the motor case 3a.

The fan 4 is located in a middle portion of the motor shaft 68, behind the motor front bearing 69, and in front of the rotor 67 and the stator 66. The fan 4 is a centrifugal fan with multiple blades. The fan 4 rotates and forces air radially outward. The fan 4 is fixed to the motor shaft 68 integrally to rotate together. The fan 4 is held on the half housing 18 with the rotor 67 and the lower power transmission housing 20b.

The lower power transmission housing 20b is in front of the fan 4.

The fan 4 may be a component of the motor 3.

The reciprocation converter 5 is a power transmission unit for transmitting power from the motor 3 to the slider 6. The reciprocation converter 5 transmits rotational motion of the motor shaft 68 of the motor 3 to the slider 6. The reciprocation converter 5 is held on the power transmission housing 20. The reciprocation converter 5 is located between the motor 3 and the slider 6.

The reciprocation converter 5 includes a bevel gear 70, a torque limiter 72, a countershaft 74, a crank base 76, and a crank cam 78.

The bevel gear 70 is a disk extending in the front-rear and lateral directions. The bevel gear 70 includes bevel teeth (not shown) on the periphery of its upper surface. The bevel gear 70 meshes with the pinion gear 68a.

The bevel gear 70 rotates about a vertical rotation axis including its center in the front-rear and lateral directions.

The torque limiter 72 is located between the bevel gear 70 and the countershaft 74.

The torque limiter 72 transmits power from the bevel gear 70 to the countershaft 74. The torque limiter 72 includes upper and lower flat plates in close contact with each other under an urging force from an elastic member. In response to an excessive load from the countershaft 74, the flat plates separate from each other against the urging force. This protects the bevel gear 70 and the motor 3 under the excessive load.

The countershaft 74 is cylindrical and extends vertically.

The countershaft 74 is supported by an upper countershaft bearing 80 and a lower countershaft bearing 82 in a manner rotatable coaxially with the bevel gear 70 on the rotation axis (FIGS. 2 and 3).

The upper countershaft bearing 80 is held on the lower power transmission housing 20b.

The lower countershaft bearing 82 is a needle bearing. The lower countershaft bearing 82 is held in a dish-shaped bearing retainer 20c. The bearing retainer 20c is fastened to the lower power transmission housing 20b with multiple screws 86 (one is shown in FIG. 3) extending vertically.

The crank base 76 is crank-shaped.

The crank base 76 includes, in its lower portion, a cylindrical part 76A screwed to an upper portion of the countershaft 74.

The crank base 76 includes a plate 76B extending in the front-rear and lateral directions in its middle portion.

The crank base 76 includes an eccentric disk 76C extending in the front-rear and lateral directions in its upper portion. The center of the eccentric disk 76C is off the central axis of the lower part of the crank base 76.

The crank cam 78 includes a crank cam body 90, an eccentric pin 92, a convex roller 94, and a bearing 96.

The crank cam body 90 is a disk extending in the front-rear and lateral directions. The crank cam body 90 has a vertical central axis that is coaxial with the rotation axis of the bevel gear 70. The crank cam body 90 includes a coupler 97 in its lower portion. The coupler 97 is cylindrical and protrudes downward relative to the other portion. The coupler 97 is coupled with the eccentric disk 76C in the crank base 76.

The crank cam body 90 also includes a cam 98 on the periphery of the upper surface of the crank cam body 90. The cam 98 protrudes upward relative to the adjacent portion. The cam 98 is annular as viewed from above. The cam 98 has a vertical length changing gradually in the circumferential direction. In other words, the upper surface of the cam 98 serves as a cam surface 99.

The eccentric pin 92 is cylindrical and extends vertically. The eccentric pin 92 has its lower portion received in a vertical hole in the crank cam body 90. The hole is radially off the central axis of the crank cam body 90.

The convex roller 94 is cylindrical. The convex roller 94 has an outer surface with a diameter increasing toward its vertically middle portion.

The convex roller 94 surrounds an upper portion of the eccentric pin 92 with the bearing 96 between them. The convex roller 94 is supported in a manner rotatable about a vertical rotation axis. The bearing 96 is a needle bearing.

Figure 5:
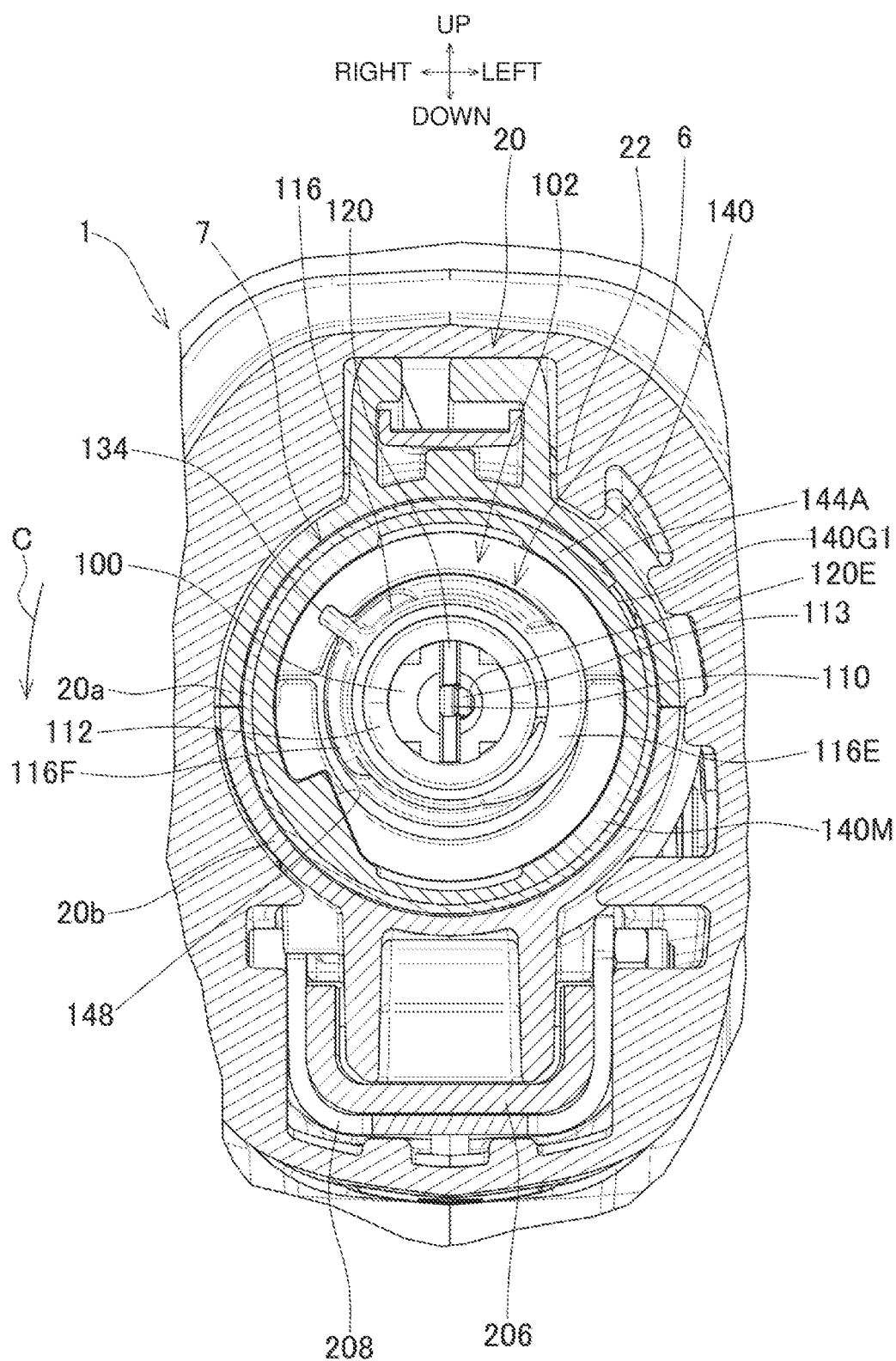
FIG. 5 is a cross-sectional view taken along line A-A in FIG. 3.
Figure 6:
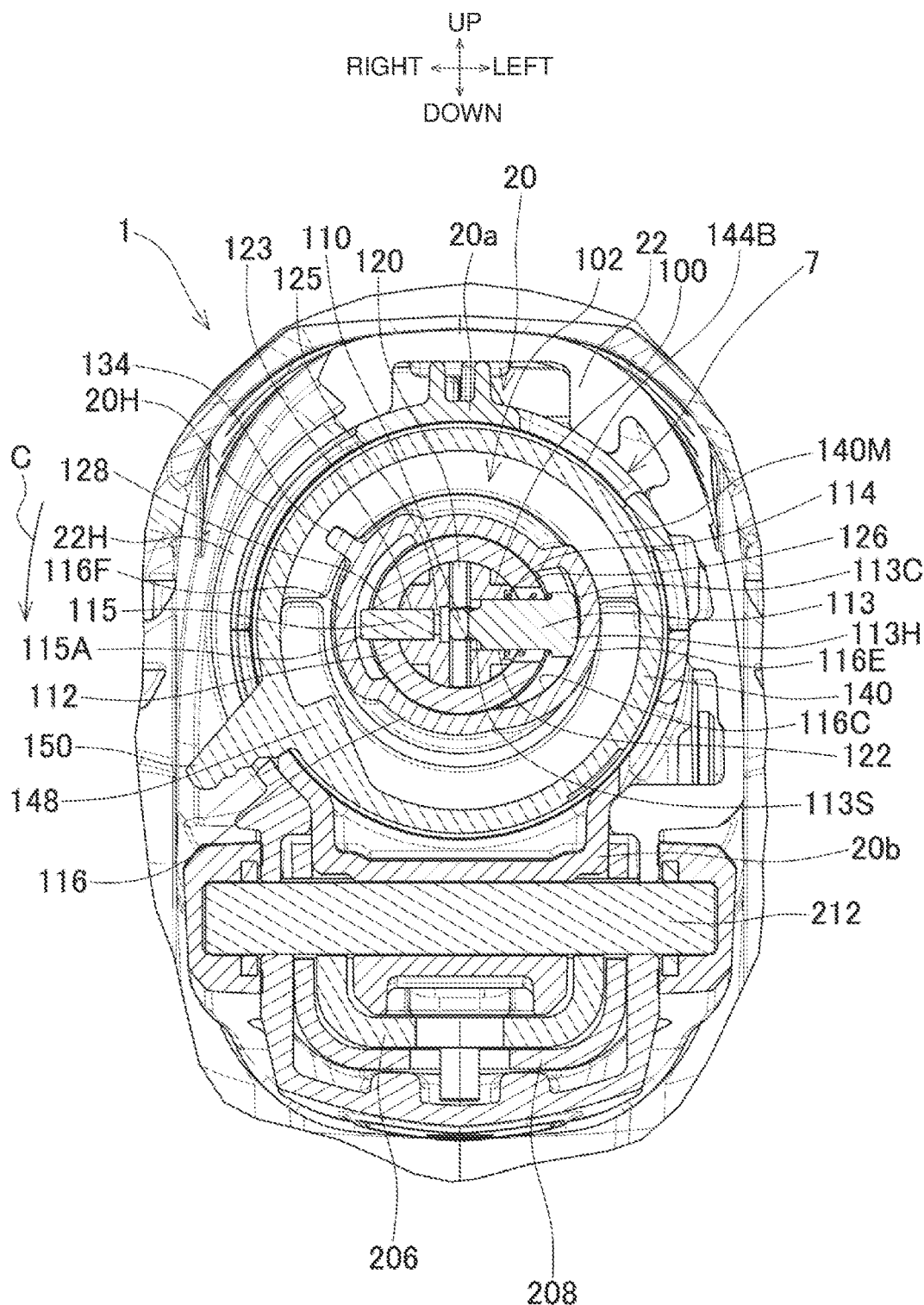
FIG. 6 is a cross-sectional view taken along line B-B in FIG. 3.
Figure 7:
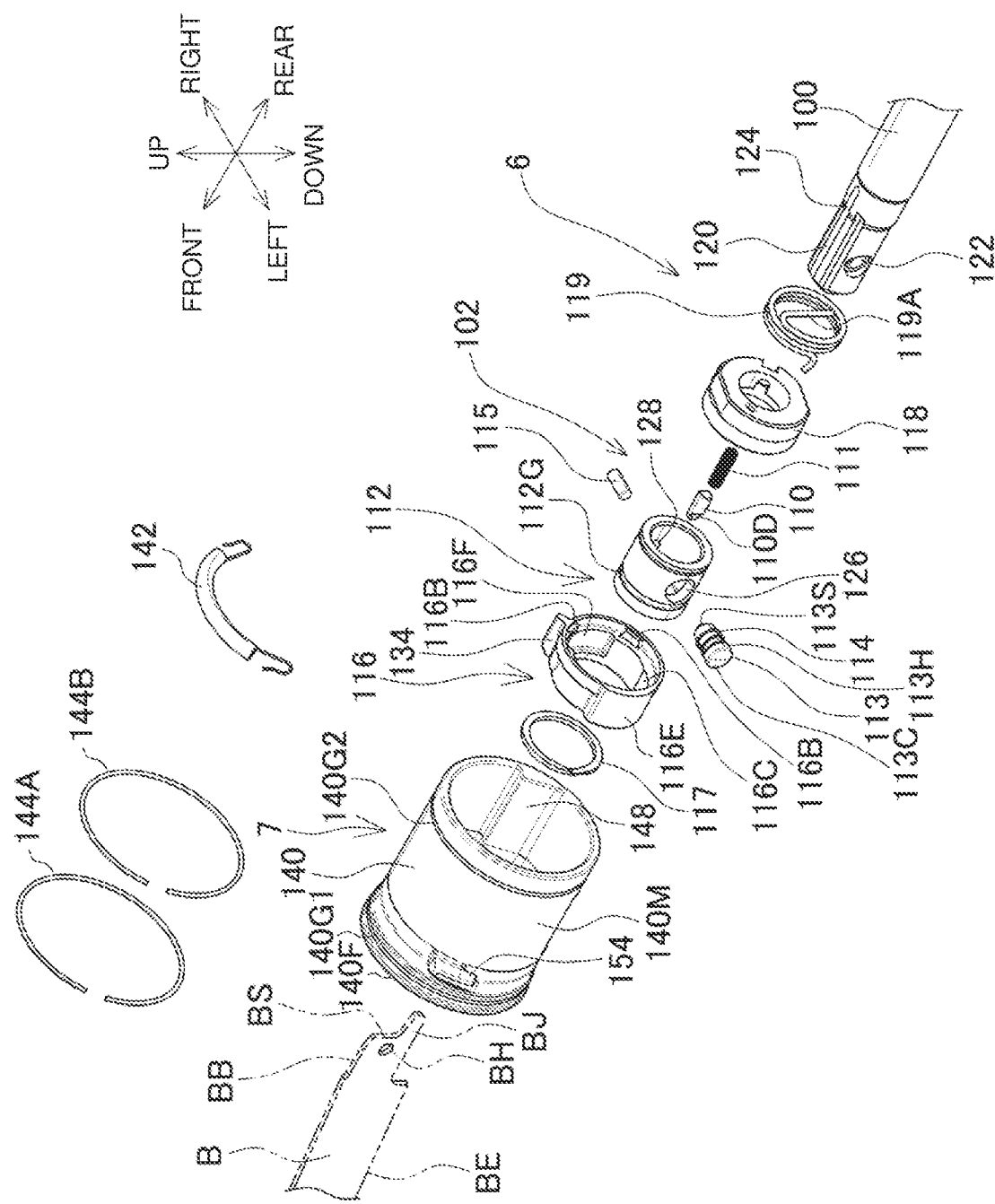
FIG. 7 is an exploded perspective view of a slider and a release unit in the reciprocating saw in FIG. 1 as viewed from the upper left rear.
Figure 8:
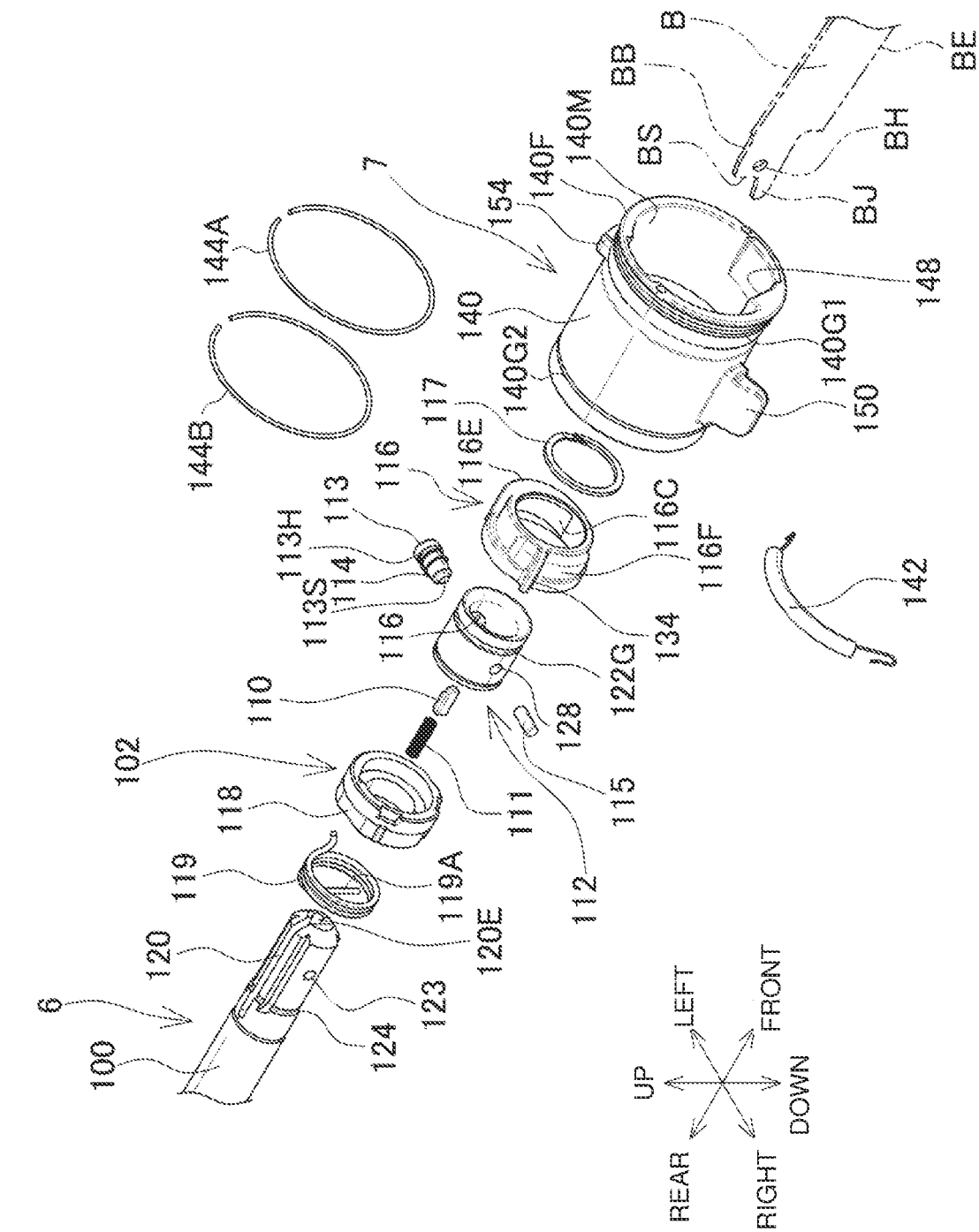
FIG. 8 is an exploded perspective view of the slider and the release unit in the reciprocating saw in FIG. 1 as viewed from the upper right front.
Figure 9A:
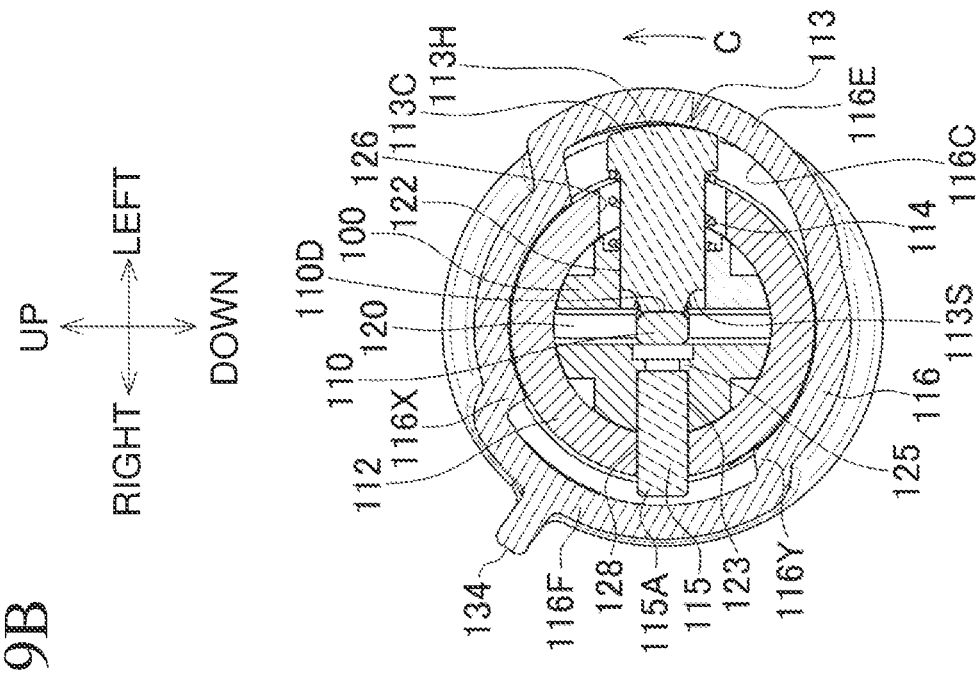
FIG. 9A is a longitudinal central sectional view of a blade holder in the slider in FIG. 6 in a blade standby state.
Figure 9B:
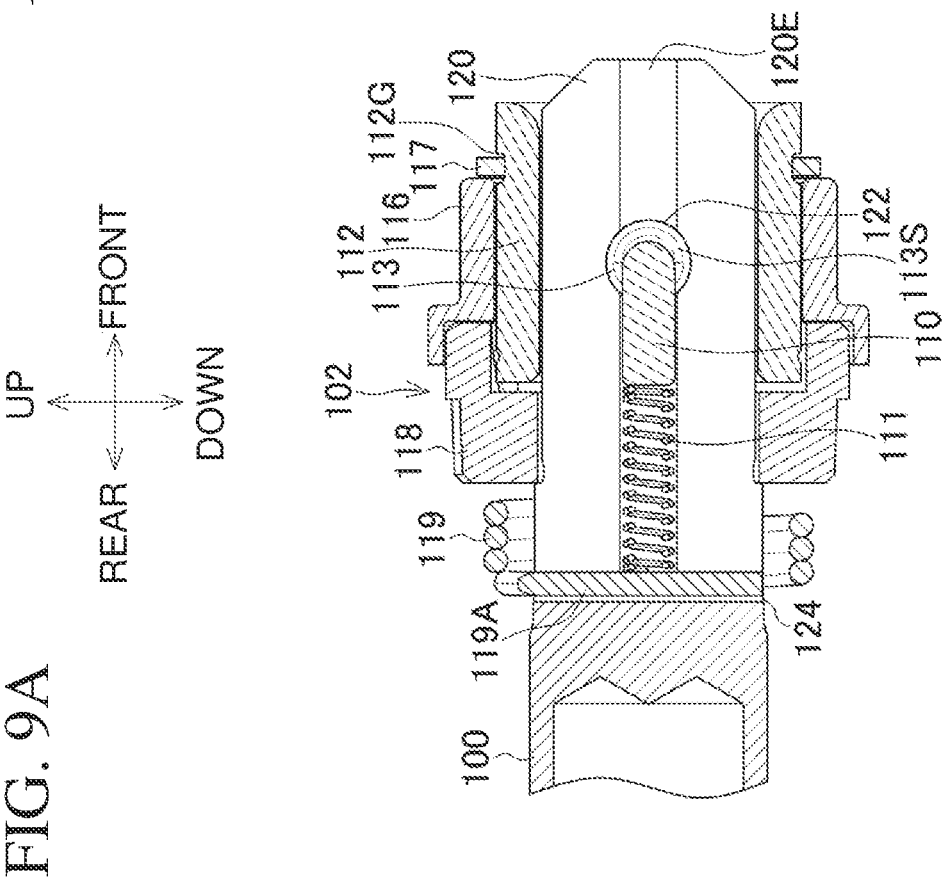
FIG. 9B is a cross-sectional view of a holder pin in the blade holder in the slider in FIG. 6 in the blade standby state.

FIG. 5 is a cross-sectional view taken along line A-A in FIG. 3. FIG. 6 is a cross-sectional view taken along line B-B in FIG. 3. FIG. 7 is an exploded perspective view of the slider 6 and the release unit 7 as viewed from the upper left rear. FIG. 8 is an exploded perspective view of the slider 6 and the release unit 7 as viewed from the upper right front. FIG. 9A is a longitudinal central sectional view of a blade holder 102 in the slider 6. FIG. 9B is a cross-sectional view of a central portion of a holder pin 113 in the blade holder 102. In FIGS. 1 to 9B, the blade holder 102 is positioned in a blade standby state waiting for a blade B.

The slider 6 includes a slider body 100 and a blade holder 102 as a tip tool holder. The slider 6 has its front end protruding from the front end of the power transmission housing 20.

The slider body 100 is cylindrical and extends in the front-rear direction. The slider body 100 includes a convex roller receiver 104 in its rear portion. The convex roller receiver 104 is a bottomed elliptical cylinder extending laterally. The convex roller receiver 104 is open downward. The convex roller receiver 104 receives the convex roller 94.

In response to rotation of the crank cam 78, the convex roller 94 rotates eccentrically. The motion of the convex roller 94 includes a front-rear component that causes the slider body 100 to reciprocate in the front-rear direction through the convex roller receiver 104. The lateral component of the motion of the convex roller 94 is its relative motion within the convex roller receiver 104, and is not transmitted to the slider body 100.

The blade holder 102 holds the blade B as a tip tool. The blade holder 102 automatically holds the blade B in response to the rear end of the blade B being simply inserted into the blade holder 102 (quick attachment).

The blade holder 102 is larger than the slider body 100 in the vertical and lateral directions. The slider 6 is an output section. The blade B is a tip tool. The blade B is an elongated plate and extends in the front-rear direction when attached. The blade B has an edge BE on a longer side. The edge BE includes saw teeth. The blade B is attached with its edge BE facing downward. The blade B may be attached with its edge BE facing upward. This reduces deteriorating operability of a release drum 140 in the reciprocating saw 1 that is handled more easily. The blade B may have edges BE on the two longer sides. The tip tool may be any tool other than the blade B.

The blade holder 102 in the slider 6 includes a push pin 110, a push-pin compression spring 111, a guide sleeve 112, a holder pin 113, a holder-pin compression spring 114, an auxiliary pin 115, a cam sleeve 116, a stop ring 117, an auxiliary sleeve 118, and a torsion spring 119.

The slider body 100 has, in its front end, a slit 120, a first holder-pin hole 122, a first auxiliary-pin hole 123, and a step 124.

The slit 120 extends in the front-rear and vertical directions. The slit 120 has a width (distance in the lateral direction) slightly larger than the thickness of the blade B. An expanded space 120E is defined in the center of the slit 120 in the vertical direction. The expanded space 120E has a space expanded to the left compared with the other portion.

The first holder-pin hole 122 is located on the left of the slit 120 and communicates with the slit 120. The first holder-pin hole 122 extends laterally. The first holder-pin hole 122 has a larger diameter in its left portion than in its right portion.

The first auxiliary-pin hole 123 is located on the right of the slit 120 and communicates with the slit 120. The first auxiliary-pin hole 123 extends laterally. The first auxiliary-pin hole 123 faces the first holder-pin hole 122. A rib 125 is in the center and left portion of the first auxiliary-pin hole 123. The rib 125 protrudes radially inward relative to the other portion.

The front end of the slider body 100 has an outer diameter smaller than the outer diameter of the rear portion of the slider body 100. The step 124 is defined in the portion where the outer diameter of the slider body 100 changes.

The slit 120 receives the push pin 110 in its middle portion in the vertical direction. The push pin 110 extends in the front-rear direction. The push pin 110 has a D-shaped cross section. The push pin 110 has a recess 110D in its front left portion. The recess 110D is recessed rightward relative to its rear portion. The push pin 110 has its portion rearward from the recess 110D received in the expanded space 120E in the slit 120.

The slit 120 receives the push-pin compression spring 111 in its middle portion in the vertical direction. The push-pin compression spring 111 has its left portion received in the expanded space 120E in the slit 120. The push-pin compression spring 111 is an elastic member, or more specifically, a coil spring. The push-pin compression spring 111 is located behind the push pin 110. The push-pin compression spring 111 has its rear end received on the rear bottom of the slit 120. The push-pin compression spring 111 has its front end in contact with the push pin 110. The push-pin compression spring 111 is located between the push pin 110 and the slider body 100. The push-pin compression spring 111 urges the push pin 110 forward.

The guide sleeve 112 is cylindrical. The guide sleeve 112 is located outside the front end of the slider body 100. The guide sleeve 112 has an axis extending in the front-rear direction.

A circular groove 112G (circular recess) is located on the front outer surface of the guide sleeve 112. The groove 112G is recessed radially inward relative to the surrounding portion. The groove 112G extends almost around the outer surface of the front of the guide sleeve 112.

The guide sleeve 112 has a second holder-pin hole 126 and a second auxiliary-pin hole 128 in its middle portion.

The second holder-pin hole 126 is located on the left of the guide sleeve 112. The second holder-pin hole 126 extends laterally. The second holder-pin hole 126 is aligned with the first holder-pin hole 122. The second holder-pin hole 126 has a larger diameter than the left portion of the first holder-pin hole 122.

The second auxiliary-pin hole 128 is located on the right of the guide sleeve 112. The second auxiliary-pin hole 128 extends laterally. The second auxiliary-pin hole 128 faces the second holder-pin hole 126. The second auxiliary-pin hole 128 has substantially the same diameter as a portion of the first auxiliary-pin hole 123 rightward from the rib 125.

The holder pin 113 is received in the first holder-pin hole 122 and the second holder-pin hole 126. The holder pin 113 is cylindrical and extends laterally. The holder pin 113 has its middle portion with substantially the same diameter as the right portion of the first holder-pin hole 122. The holder pin 113 has a right end with a smaller diameter than the other portion. The holder pin 113 has a step 113S on the right end (stepped pin). The holder pin 113 is tapered rightward. The holder pin 113 has a left end with a larger diameter than the other portion. The left end of the holder pin 113 is a head 113H with a larger diameter than the other portion. The holder pin 113 has a curved left surface 113C expanding leftward.

The holder-pin compression spring 114 is an elastic member, or more specifically, a coil spring. The holder-pin compression spring 114 has its right end in contact with the larger-diameter portion of the first holder-pin hole 122. The holder-pin compression spring 114 has its left end in contact with the right surface of the head 113H of the holder pin 113. The holder-pin compression spring 114 is located between the holder pin 113 and the slider body 100. The holder-pin compression spring 114 urges the holder pin 113 rightward.

The auxiliary pin 115 is received in the first auxiliary-pin hole 123 and the second auxiliary-pin hole 128. The auxiliary pin 115 is cylindrical and extends laterally. The auxiliary pin 115 has its left end to be in contact with the rib 125 on the first auxiliary-pin hole 123. The right end of the auxiliary pin 115 protrudes rightward from the second auxiliary-pin hole 128 to serve as an exposed portion 115A. The auxiliary pin 115 has substantially the same diameter as the right portion of the first auxiliary-pin hole 123 and as the second auxiliary-pin hole 128. The auxiliary pin 115 connects the guide sleeve 112 with the slider body 100.

The cam sleeve 116 is cylindrical. The cam sleeve 116 has an axis extending in the front-rear direction. The cam sleeve 116 is located outside the guide sleeve 112, the holder pin 113, and the auxiliary pin 115. The cam sleeve 116 is rotatable about the slider body 100 and the guide sleeve 112.

The cam sleeve 116 has a first extension 116E in its upper to left portions. The first extension 116E extends radially outward relative to the other portion of the cam sleeve 116. The first extension 116E has a cam surface 116C on its inner surface. The cam surface 116C has a radial dimension gradually increasing counterclockwise (attaching direction C) from the bottom as viewed from the front. The cam surface 116C is in contact with the curved surface 113C of the head 113H of the holder pin 113. Without the blade holder 102 receiving the blade B (blade standby state), the curved surface 113C is in contact with a portion of the cam surface 116C nearer the largest radial dimension.

The cam sleeve 116 includes a second extension 116F. The second extension 116F extends from the top to the right of the cam sleeve 116. The second extension 116F extends radially outward relative to the other portion of the cam sleeve 116. A space is defined between the second extension 116F and the guide sleeve 112. The upper first end 116X of the second extension 116F has a surface extending in the radial and front-rear directions. A lower second end 116Y of the second extension 116F has a surface extending in the radial and front-rear directions.

The cam sleeve 116 includes a projection 134 protruding radially outward. The projection 134 is located outward from the second extension 116F. The projection 134 is positioned in the upper right in the blade standby state.

Multiple protrusions 116B are arranged on the inner surface of the opening at the rear end of the cam sleeve 116. Each protrusion 116B projects radially inward from the other inner surface. The multiple protrusions 116B are aligned with one another circumferentially.

The stop ring 117 is annular. The stop ring 117 received in the groove 112G is fixed on the outer surface of the guide sleeve 112. The stop ring 117 is located in front of the cam sleeve 116 to restrict the forward movement of the cam sleeve 116.

The auxiliary sleeve 118 is cylindrical. The auxiliary sleeve 118 has an axis extending in the front-rear direction. The auxiliary sleeve 118 surrounds the slider body 100 and is rotatable about the slider body 100. The auxiliary sleeve 118 is located in front of the step 124. The step 124 restricts backward movement of the auxiliary sleeve 118.

Multiple recesses 118P are located on the outer surface of the opening at the front end of the auxiliary sleeve 118. Each recess 118P recesses radially inward from the other outer surface. The front end of the auxiliary sleeve 118 is received in the opening in the rear end of the cam sleeve 116. The recesses 118P on the auxiliary sleeve 118 receive the corresponding protrusions 116B on the cam sleeve 116. The auxiliary sleeve 118 rotates together with the cam sleeve 116.

The torsion spring 119 is an annular elastic member. The torsion spring 119 has its rear end extending vertically in the middle in the lateral direction to serve as a connection 119A. The connection 119A is received in the slit 120. The connection 119A is located between the rear bottom of the slit 120 and the rear end of the push-pin compression spring 111. The connection 119A is fixed to the slider body 100. The torsion spring 119 excluding the connection 119A surrounds the front end of the slider body 100 and is located behind the auxiliary sleeve 118. The torsion spring 119 has its front end received in a hole in the front-rear direction in the auxiliary sleeve 118 and fixed to the auxiliary sleeve 118. The torsion spring 119 urges the auxiliary sleeve 118 circumferentially counterclockwise (attaching direction C) as viewed from the front.

The blade B has a holding hole BH in its rear end. The holding hole BH has a slightly larger diameter than the left end of the holder pin 113.

The blade B has a cutout in its corner opposite to the rear end of the edge BE. The blade B has a protruding tab BJ on its rear end protruding rearward on the same side as the edge BE. The blade B has a shoulder BS at the upper rear of the protruding tab BJ.

The blade B has a protrusion BB at its rear end. The protrusion BB is located opposite to the edge BE. The protrusion BB protrudes upward relative to the other portion of the upper side of the blade B.

Figure 11A:
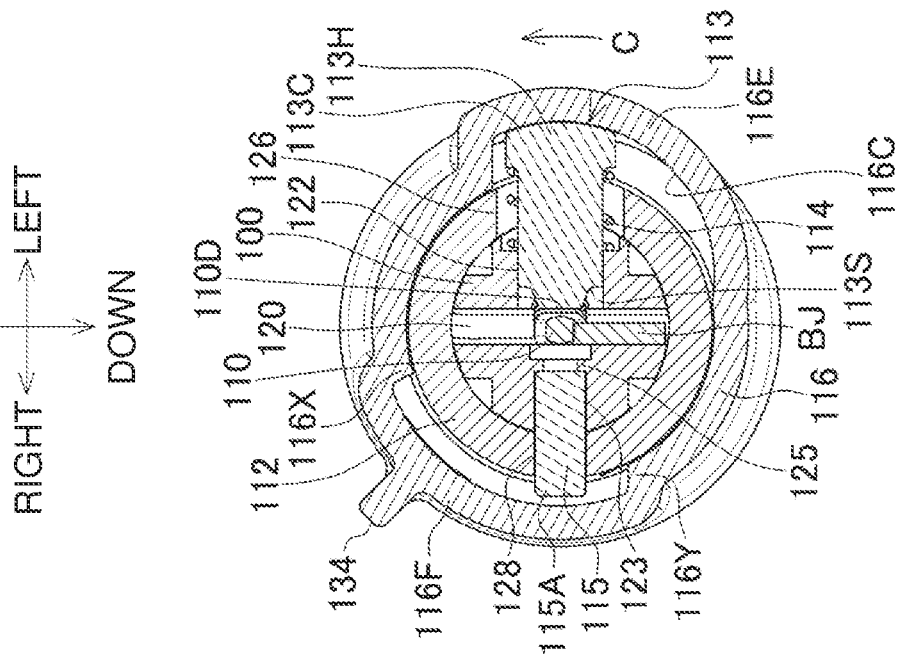
FIG. 11A is a longitudinal central sectional view of the blade holder in the slider in FIG. 6 in a blade detached state.
Figure 11B:
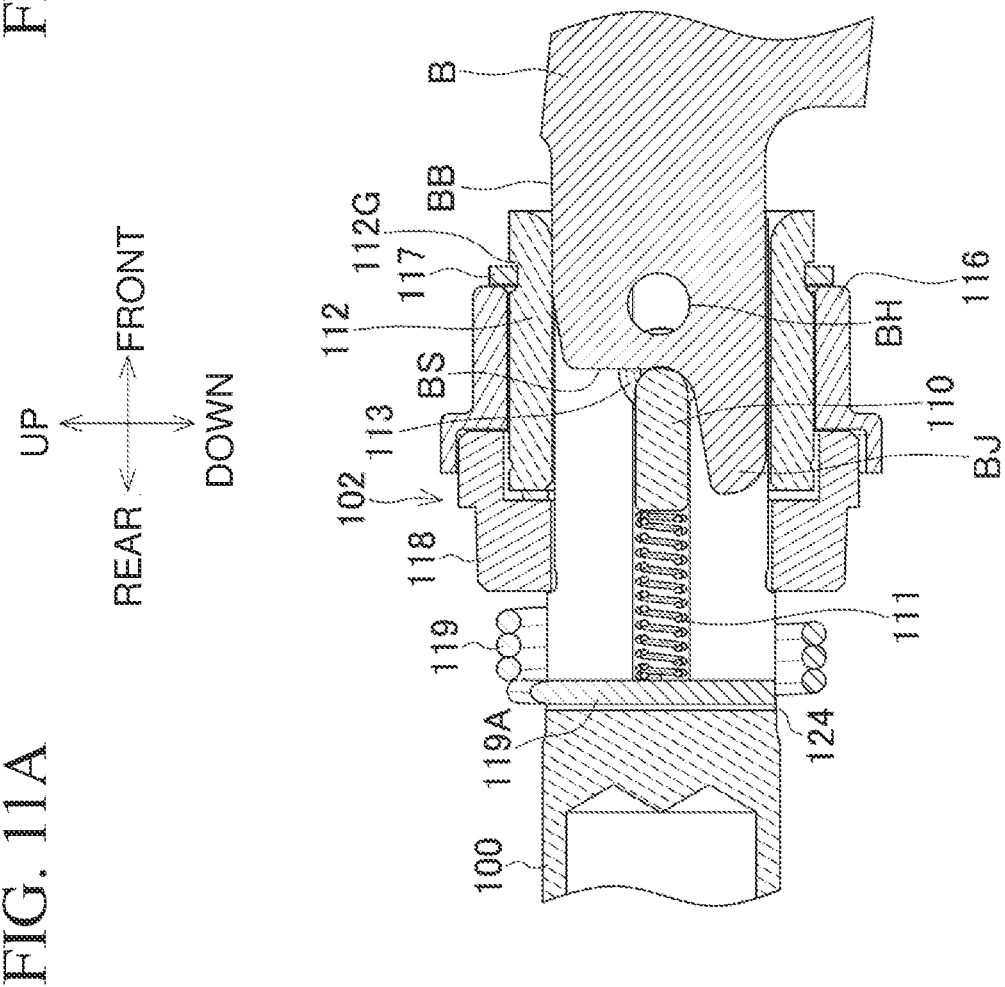
FIG. 11B is a cross-sectional view of the holder pin in the blade holder in the slider in FIG. 6 in the blade detached state.

FIG. 10A is a longitudinal central sectional view of the blade holder 102 in a blade attached state. FIG. 10B is a cross-sectional view of the central portion of the holder pin 113 in the blade holder 102 in the blade attached state. FIG. 11A is a longitudinal central sectional view of the blade holder 102 in a blade detached state. FIG. 11B is a cross-sectional view of the central portion of the holder pin 113 in the blade holder 102 in the blade detached state.

Without the rear end of the blade B received in the slit 120 (FIGS. 9A and 9B), the front end of the push pin 110 is located leftward adjacent to the holder pin 113. The holder pin 113 retracts leftward. An exposed portion 115A of the auxiliary pin 115 is adjacent to the second end 116Y of the second extension 116F.

With the rear end of the blade B received in the slit 120, the blade B pushes, with the shoulder BS, the push pin 110 backward against the urging force from the push-pin compression spring 111.

When the rear end of the blade B moves further backward to cause the holding hole BH in the blade B to reach the right of the holder pin 113, the cam surface 116C of the cam sleeve 116 pushes the holder pin 113 leftward against the urging force from the holder-pin compression spring 114. More specifically, the cam sleeve 116 is urged by the torsion spring 119 through the auxiliary sleeve 118. The direction of the force applied from the torsion spring 119 is the attaching direction C. In response to the holding hole BH in the blade B reaching the left of the holder pin 113 to allow the holder pin 113 to move leftward, the cam sleeve 116 rotates in the attaching direction C. The curved surface 113C of the holder pin 113 comes in contact with an inwardly extending portion (a portion with a smaller diameter, or specifically, a portion near the smallest diameter portion of the cam surface 116C) of the cam surface 116C. The cam surface 116C thus pushes the holder pin 113 leftward.

In response to the holder pin 113 being pushed leftward, a portion leftward from the step 113S of the holder pin 113 is received in the holding hole BH in the blade B to hold (attach) the blade B (blade attached state, refer to FIGS. 10A and 10B).

The blade B is thus automatically held when simply inserted in the slit 120 (quick attachment).

When the holder pin 113 holds the blade B, the projection 134 on the cam sleeve 116 is positioned on the right as the cam sleeve 116 rotates. The exposed portion 115A of the auxiliary pin 115 is adjacent to the first end 116X of the second extension 116F.

The protrusion BB on the blade B held by the blade holder 102 comes in contact with the front end face of the guide sleeve 112.

The auxiliary pin 115, which is different from the holder pin 113, fixes the guide sleeve 112 to restrict its movement in the front-rear direction and its rotation relative to the slider body 100. The holder pin 113 is received in the first holder-pin hole 122 having the left portion with the larger diameter.

The blade B held in the blade holder 102 is detached from the blade holder 102 in cooperation with the release unit 7.

The release unit 7 includes the release drum 140, a tension spring 142 being an elastic member, and multiple (two) ring springs 144A and 144B. This further reduces deteriorating operability of the release drum 140.

The release drum 140 is cylindrical and surrounds the cam sleeve 116. The release drum 140 is adjacent to the blade holder 102. The release drum 140 is an operating drum operable by the user to detach (release) the blade B from the blade holder 102.

The release drum 140 is formed from a synthetic resin. Thus, the release drum 140 and the surrounding components have better resistance to external electric shocks than those entirely formed from a metal. The release drum 140 with a complex shape is formed easily. When the release drum 140 and the power transmission housing 20 are formed from different materials, the ring springs 144A and 144B are formed from a material more similar to the material for the power transmission housing 20 than the release drum 140. This reduces deteriorating operability of the release drum 140, and allows the release drum 140, the ring springs 144A and 144B, and the power transmission housing 20 to have a longer service life.

The release drum 140 includes a release drum body 140M, an inner ridge 148, an operation tab 150, and an engagement portion 154.

The inner ridge 148 is located on the inner surface of the release drum 140. The inner ridge 148 is raised radially inward from the other portion of the inner surface of the release drum 140. The inner ridge 148 is located in a right portion of the release drum 140.

The operation tab 150 is located in the right portion of the release drum 140. The operation tab 150 is located radially outward from the inner ridge 148. The operation tab 150 protrudes radially outward relative to the other portion of the outer surface. The operation tab 150 is trapezoidal in a cross-section. The operation tab 150 has its distal end thinner than its basal end. The operation tab 150 extends from the upper left to the lower right, and extends in the front-rear direction in the blade standby state. The operation tab 150 is integral with the other portion of the release drum 140 (cylindrical release drum body 140M). The operation tab 150 protrudes rightward through a first operation tab hole 20H in the power transmission housing 20 and a second operation tab hole 22H in the cover 22.

An engagement portion 154 is located on an outer surface of an upper right portion of the release drum 140. The engagement portion 154 protrudes radially outward relative to the other portion of the outer surface. The engagement portion 154 has a hook shape. The engagement portion 154 is integral with the release drum body 140M.

A circular groove 140G1 (circular recess) is located on the front outer surface of the guide drum body 140M. The groove 140G1 is recessed radially inward relative to the adjacent portions of the release drum body 140M. An imaginary plane including the groove 140G1 is orthogonal to the central axis of the release drum body 140M.

A circular groove 140G2 (circular recess) is located on the rear outer surface of the guide drum body 140M. The groove 140G2 is recessed radially inward relative to the adjacent portions of the release drum body 140M. An imaginary plane including the groove 140G2 is orthogonal to the central axis of the release drum body 140M.

The release drum body 140M has a flange 140F on its front end. The flange 140F extends radially outward relative to the adjacent portions. The groove 140G1 is located behind the flange 140F.

The tension spring 142 is a coil spring. The tension spring 142 is located circumferentially outside the release drum 140 and extends circumferentially on the release drum body 140M. The tension spring 142 is located in an upper portion of the release drum body 140M.

The tension spring 142 has a hook-shaped first end to be engaged with the engagement portion 154 on the release drum 140. The tension spring 142 has a hook-shaped second end fixed to the upper power transmission housing 20a.

The ring spring 144A is an elastic ring member and is a single-layer spring. The ring spring 144A has a dimension (width) of 1 millimeter (mm) in the front-back direction. The ring spring 144A is formed from iron (including an alloy), or more specifically, stainless steel. The ring spring 144A is C-shaped as viewed from the front, has a break, and is not a completely closed ring. The ring spring 144A is fitted into the groove 140G1 on the release drum 140. The ring spring 144A has a radially inward portion that is received in the groove 140G1. The ring spring 144A has a radially outward portion that protrudes radially outward from the groove 140G1.

The ring spring 144B is an elastic ring member and is a single-layer spring. The ring spring 144B has a dimension (width) of 1 millimeter (mm) in the front-back direction. The ring spring 144B is formed from iron (including alloys), or more specifically, stainless steel. The ring spring 144B is C-shaped as viewed from the front, has a break, and is not a completely closed ring. The ring spring 144B is fitted into the groove 140G2 on the release drum 140. The ring spring 144B has a radially inward portion that is received in the groove 140G2. The ring spring 144B has a radially outward portion that protrudes radially outward from the groove 140G2.

This allows the ring springs 144A and 144B to be more easily installed to maintain the operability of the release drum 140. The ring springs 144A and 144B are more robust.

The position of the break in at least one of the ring spring 144A or 144B is not limited to that illustrated in FIG. 4. At least one of the ring spring 144A or 144B may be a fully closed ring or a spring including more than a single layer. At least one of the ring spring 144A or 144B may not be elastic and may be attached to the release drum 140 by adhesion or other methods. At least one of the ring spring 144A or 144B can be formed from iron other than stainless steel or a metal other than iron. At least one of the ring spring 144A and 144B may be on the inner surface of the power transmission housing 20. The ring springs 144A and 144B may be replaced by a single ring spring or three or more ring springs.

With the tension spring 142 slightly stretched from its equilibrium length, the inner ridge 148 on the release drum 140 is not in contact with the projection 134 on the cam sleeve 116 in the blade attached state. In this state, the operation tab 150 on the release drum 140 is in contact with the lower ends of the first operation tab hole 20H and the second operation tab hole 22H. The rotational position of the release drum 140 in this state is an initial rotational position of the release drum 140. In this state, the tension spring 142 may be in other states, such as a state having the equilibrium length.

The user operates the operation tab 150 at a lower position upward to rotate the release drum 140 about its central axis extending in the front-rear direction against an urging force from the tension spring 142. In this state, the operation tab 150 is rotatable to be in contact with the upper ends of the first operation tab hole 20H and the second operation tab hole 22H at maximum. This causes the inner ridge 148 to come in contact with the projection 134 on the cam sleeve 116, rotating and moving the projection 134, and thus rotating the cam sleeve 116 in a direction opposite to the attaching direction C. This places the curved surface 113C of the holder pin 113 inside a larger diameter portion of the cam surface 116C. The holder pin 113 then retracts rightward and is removed (detached) from the holding hole BH in the blade B under the urging force from the holder-pin compression spring 114. The push pin 110 then moves forward under the urging force from the push-pin compression spring 111 to push the detached blade B forward and moves to the right of the holder pin 113 (FIGS. 11A and 11B). The push pin 110 smoothly moves to the right of the holder pin 113 with the recess 110D on the front end of the push pin 110.

The release drum 140 in the release unit 7 cooperates with the internal blade holder 102, causing the blade B to be released from the blade holder 102 in response to the upward operation performed on the operation tab 150. Rotation of the projection 134 is the operation to detach the blade B from the blade holder 102, or specifically, detachment operation of the blade holder 102. The detachment operation is performed for detaching the blade B. This further reduces deteriorating operability of the release drum 140 for the detachment operation. The release unit 7 (release drum 140) rotates to cause the detachment operation of the blade holder 102. This reduces deteriorating operability of the release drum 140, which causes the operation of the blade holder 102 through rotational movement. The projection 134 on the blade holder 102 may be used to perform attachment of the blade B. The operating drum may also be used to perform attachment of the blade B.

The push pin 110 on the right of the holder pin 113 restricts rightward movement of the holder pin 113. As a result, the holder pin 113 resists the force from the torsion spring 119 in the attaching direction C and restricts the rotation of the cam sleeve 116 in the attaching direction C.

The release drum 140 returns downward under the urging force from the tension spring 142.

The reciprocating saw 1 according to the present embodiment allows the user to attach the blade B through quick attachment. For products in other forms, however, the user rotates the operating drum when attaching the blade B. In such products, a component corresponding to the holder pin 113 received in the holding hole BH in the blade B retracts from the holding hole BH when a rotating operation of the operating drum is performed by the user. The component corresponding to the holder pin 113 thus does not retract when the user simply inserts the blade B for attaching. In such products, the operating drum is operated in attaching and detaching the blade B and is thus operated more frequently than in the reciprocating saw 1. Such products are to reduce deteriorating movement of the operating drum more than the reciprocating saw 1. More specifically, the portion including the ring spring 144A reduces deteriorating movement of the operating drum in the reciprocating saw 1. This portion is to be included in other products including the operating drum to be operated in attaching the blade B.

Figures 12A, 12B:
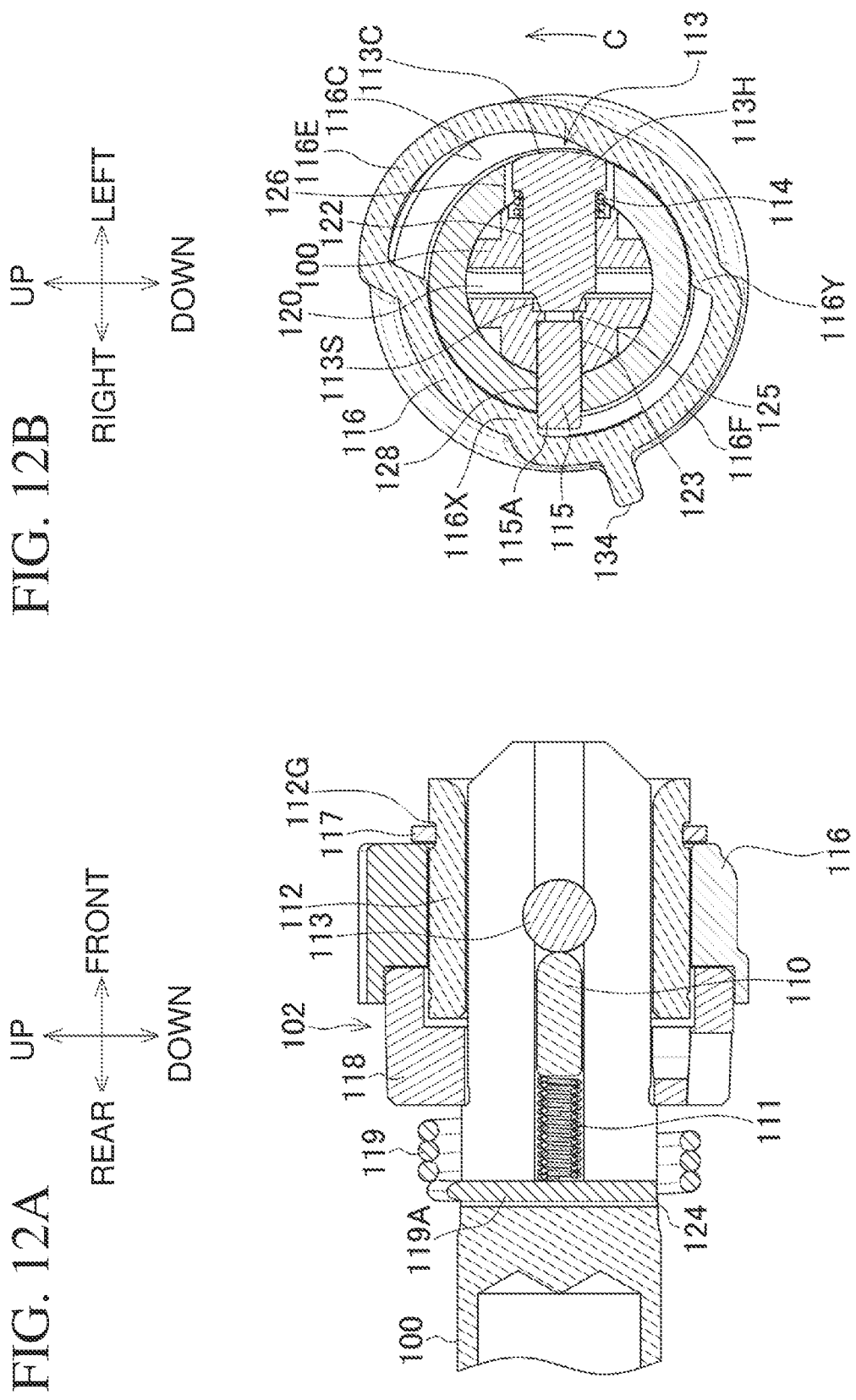
FIG. 12A is a longitudinal central sectional view of the blade holder in the slider in FIG. 6 showing the holder pin in a bottomed state.
FIG. 12B is a cross-sectional view of the holder pin in the blade holder in the slider in FIG. 6 in the bottomed state.

FIG. 12A is a longitudinal central sectional view of the blade holder 102 showing the holder pin in a bottomed state.

FIG. 12B is a cross-sectional view of a central portion of the holder pin 113 in the blade holder 102 in the bottomed state.

The push pin 110 may not be held on the right of the holder pin 113 when the blade B is not received in the blade holder 102. This may be due to the type of the blade B or under vibrations or by other factors. In this state, the head 113H of the holder pin 113 is positioned beyond the end of the cam surface 116C in the direction opposite to the attaching direction C. The holder pin 113 is pressed rightward (in a bottomed state) by the inner surface of the cam sleeve 116 other than the cam surface 116C.

In the bottomed state, the cam sleeve 116 may further rotate without engagement with the holder pin 113 in the direction opposite to the attaching direction C from the position shown in FIGS. 12A and 12B. This may be caused by at least wear on the inner surface of the cam sleeve 116 or variations in assembly accuracy. Such rotation without engagement may cause the projection 134 to rotate beyond the inner ridge 148 on the release drum 140 and reach the left of the inner ridge 148 (a position forward from the inner ridge 148 in the attaching direction C). In this state, the inner ridge 148 is not engaged with the projection 134 when the operation tab 150 on the release drum 140 is operated, thus disabling the release operation of the blade B.

However, in the reciprocating saw 1 according to the embodiment, the exposed portion 115A of the auxiliary pin 115 in contact with the first end 116X of the second extension 116F reduces such rotation without engagement.

In the reciprocating saw 1, the holder pin 113 is less likely to be in a bottomed state and is less likely to rotate without engagement, thus reducing the likelihood of release operation failure.

Figure 13:
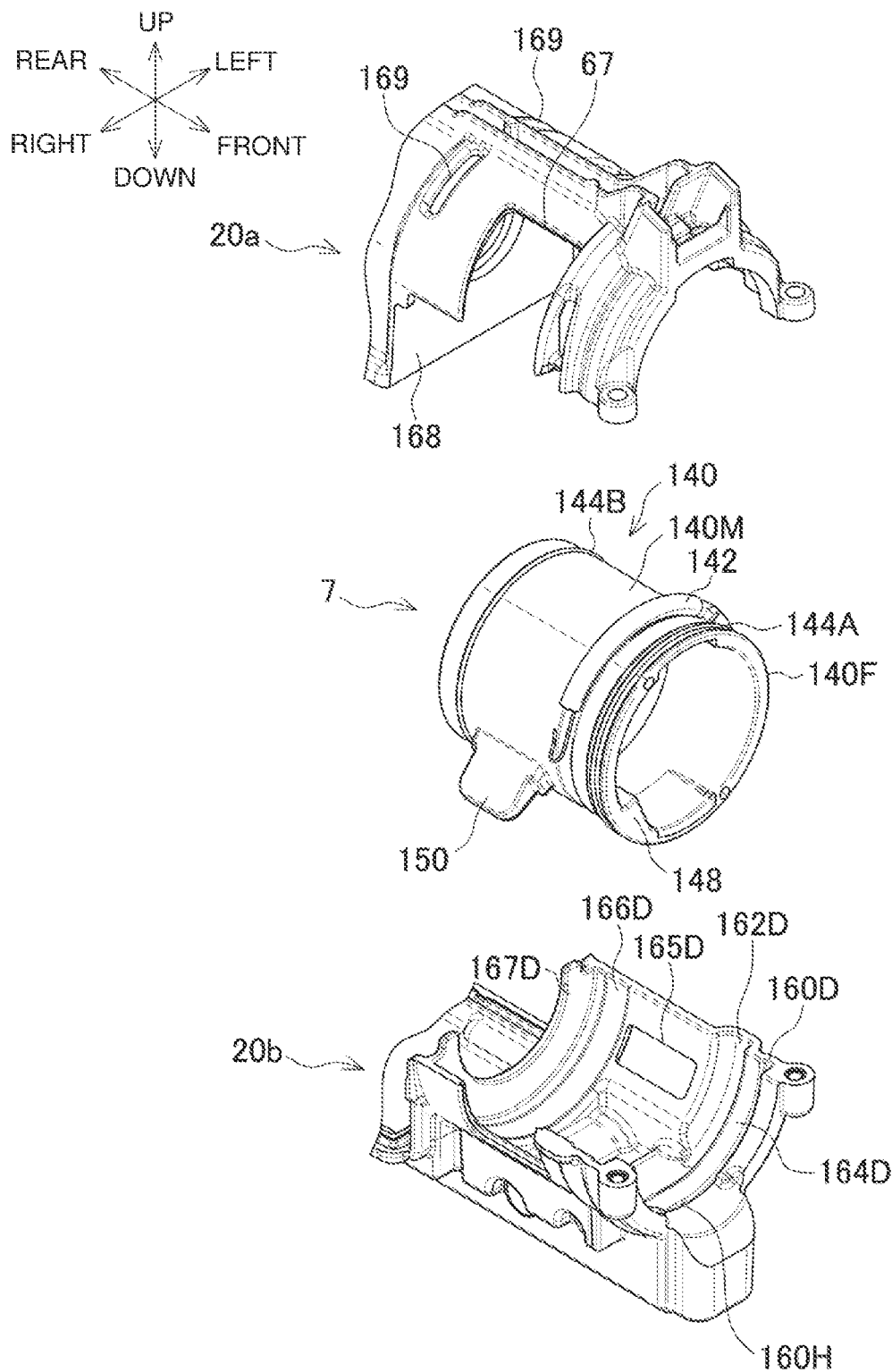
FIG. 13 is an exploded perspective view of a front part of an upper power transmission housing, the release unit, and a front part of a lower power transmission housing of the reciprocating saw in FIG. 1 as viewed from above.

FIG. 13 is an exploded perspective view of a front part of the upper power transmission housing 20a, the release unit 7, and a front part of the lower power transmission housing 20b as viewed from above. FIG. 14 is an exploded perspective view of the front part of the upper power transmission housing 20a, the release unit 7, and the front part of the lower power transmission housing 20b as viewed from below.

The release unit 7 is located in the cylindrical front end of the power transmission housing 20.

The upper power transmission housing 20a has a first upper groove 160U with a semicircular arc shape extending laterally on its inner surface of the front end. The first upper groove 160U recesses radially outward relative to the adjacent portions. The first upper groove 160U receives a half of the flange 140F on the release drum 140.

A second upper groove 162U with a semicircular arc shape extends laterally behind the first upper groove 160U. The second upper groove 162U recesses radially outward relative to the adjacent portions. The second upper groove 162U receives the tension spring 142.

A first upper cylindrical band 164U with a semicircular arc shape is located between the first upper groove 160U and the second upper groove 162U. Multiple (two) lightening holes 165U are located behind the second upper groove 162U. A second upper cylindrical band 166U with a semicircular arc shape is located behind the lightening holes 165U.

An upper semicircular arc wall 167U and a wall 168 are located behind the second upper cylindrical band 166U. The upper semicircular arc wall 167U protrudes radially inward in a semicircular arc. The wall 168 has a central hole and extends vertically and laterally. Multiple (two) vents 169 are aligned laterally between the upper semicircular arc wall 167U and the wall 168.

The lower power transmission housing 20b has a first lower groove 160D with a semicircular arc shape extending laterally on its inner surface of the front end. The first lower groove 160D recesses radially outward relative to the adjacent portions. The first lower groove 160D receives another half of the flange 140F on the release drum 140. The first lower groove 160D has a vertical hole 160H in its lower end. The hole 160H allows chips entering the first upper groove 160U and the first lower groove 160D to be discharged downward. In addition, the release drum 140 is prevented from slipping off to reduce deteriorating operability of the release drum 140.

A second lower groove 162D with a quarter arc shape extends laterally behind the first lower groove 160D. The second lower groove 162D recesses radially outward relative to the adjacent portions. The second lower groove 162D is located in a left portion of the lower power transmission housing 20b. The second lower groove 162D receives the engagement portion 154 on the release drum 140.

A first lower cylindrical band 164D with a semicircular arc shape is located between the first lower groove 160D and the second lower groove 162D. A lightning hole 165D is located behind the second lower groove 162D. A second lower cylindrical band 166D with a semicircular arc shape is located behind the lightning hole 165D. A lower semicircular arc wall 167D protrudes radially inward in a semicircular arc behind the second upper cylindrical band 166U.

The first upper groove 160U and the first lower groove 160D face each other and are continuous with each other. The second upper groove 162U and the second lower groove 162D face each other and are continuous with each other. The first upper cylindrical band 164U and the first lower cylindrical band 164D face each other and are continuous with each other. The second upper cylindrical band 166U and the second lower cylindrical band 166D face each other and are continuous with each other. The upper semicircular arc wall 167U and the lower semicircular arc wall 167D face each other and are continuous with each other.

The first upper groove 160U and the first lower groove 160D, the first upper cylindrical band 164U and the first lower cylindrical band 164D, and the second upper groove 162U and the second lower groove 162D are adjacent to each other in the front-rear direction. This reduces deteriorating operability, prevents the release drum 140 from slipping off, and allows its surrounding components to be smaller. This reduces deteriorating operability and allows the release drum 140 to return to the initial rotational position and its surrounding components to be smaller.

The release drum body 140M is located rearward from the first upper groove 160U and the first lower groove 160D and frontward from the upper semicircular arc wall 167U and the lower semicircular arc wall 167D.

The first upper cylindrical band 164U and the first lower cylindrical band 164D both formed from aluminum are in contact with the front ring spring 144A formed from iron. The second upper cylindrical band 166U and the second lower cylindrical band 166D both formed from aluminum are in contact with the rear ring spring 144B formed from iron. The release drum 140 is in contact with the power transmission housing 20 with the two ring springs 144A and 144B in between and is not in contact with the power transmission housing 20 basically. The release drum 140 and the two ring springs 144A and 144B remain in contact with one another during the rotation of the release drum 140.

The release drum 140 and the two ring springs 144A and 144B in contact with one another reduce chips entering a portion rearward from the front ring spring 144A and a portion frontward from the rear ring spring 144B. The release drum body 140M is in line contact with the power transmission housing 20 with the two ring springs 144A and 144B between them when chips are between the release drum body 140M and the power transmission housing 20. The contact area of line contact is thus smaller than the contact area of surface contact, reducing the likelihood that the release drum 140 catches chips and is difficult to rotate.

When the release drum 140 formed from a synthetic resin comes in wide contact with the power transmission housing 20 formed from aluminum, the portion of the release drum 140 in contact with the power transmission housing 20 may melt after long-term use. However, in the reciprocating saw 1 according to the embodiment, the metal ring springs 144A and 144B are in contact with the power transmission housing 20, reducing the likelihood that the release drum 140 melts.

At least to reduce the contact area or to reduce melting of the release drum 140 formed from a synthetic resin, at least one of the ring spring 144A or 144B may have a width of 4 mm or less, 3 mm or less, 2 mm or less, or 1 mm or less. This reduces the contact area of the ring springs 144A and 144B with the power transmission housing 20, further reducing deteriorating operability of the release drum 140.

In addition to the ring springs 144A and 144B, one or more seals such as elastic rings may be located to reduce entry of chips. At least any of the first upper cylindrical band 164U, the first lower cylindrical band 164D, the second upper cylindrical band 166U, or the second lower cylindrical band 166D may have irregularities in the radial direction. At least one of the ring spring 144A or 144B may be in contact with inward portions of the irregularities. In this case, the contact area is further reduced.

The counterweight 9 is combined with the reciprocation converter 5.

The counterweight 9 includes a metal balancer 170 and a ring 172.

The balancer 170 is a plate extending in the front-rear and lateral directions. The balancer 170 has a slit 174 extending laterally in a middle portion. A portion of the balancer 170 frontward from the slit 174 is heavier than a portion rearward from the slit 174.

The slit 174 in the balancer 170 receives the coupler 97 in the crank cam 78 with the ring 172.

The balancer 170 reciprocates in the front-rear direction as the crank cam 78 rotates. The coupler 97 is located opposite to the convex roller 94 from the center of the crank cam body 90. More specifically, the coupler 97 and the convex roller 94 are at an angle of about 1750 to each other about the center of the crank cam body 90 in the front-rear and lateral directions. The portion of the balancer 170 frontward from the slit 174 thus basically moves opposite to the movement of the slider 6 in the front-rear direction. The balancer 170 thus reduces vibrations generated from the reciprocation of the slider 6. More specifically, the balancer 170 moves in the direction opposite to the backward and forward motion of the slider 6, and thus serves as a counterweight.

The lateral component in the motion of the coupler 97 is its relative motion within the slit 174, and is not transmitted to the balancer 170. The angle between the coupler 97 and the convex roller 94 may be 180° or any other angle.

The orbital unit 12 includes a slider support body 180, multiple (two) oilless bearings 181 as slider supports, multiple (two) plates 182, a slider support shaft 183, multiple springs 184 as elastic members, a bearing 186, and multiple screws 190.

The slider support body 180, the oilless bearings 181, the plates 182, the bearing 186, and the screws 190 are included in a cylindrical slider support 191. The bearing 186 and other components may be eliminated from the components of the slider support 191. At least one of the slider support shaft 183 or the springs 184 may be included in the components of the slider support 191.

The slider support body 180 is a metal box extending in the front-rear direction.

The slider support body 180 holds the oilless bearings 181 on its front and rear portions. The oilless bearings 181 each have a square cross section.

The slider 6 extends through the oilless bearings 181 in a reciprocable manner.

The slider support body 180 has an opening in its lower middle portion, where the convex roller 94 and the convex roller receiver 104 can be located. The oilless bearings 181 are located in front of and behind the opening.

A rear plate 182 is fastened to a lower rear portion of the slider support body 180 below a rear oilless bearing 181 with multiple (two, or right and left) screws 190 extending vertically. The rear plate 182 is formed from a metal, and extends in the front-rear and lateral directions. The slider support body 180 holds the rear oilless bearing 181 from above. The rear plate 182 holds the rear oilless bearing 181 from below.

A front plate 182 is fastened to a lower front portion of the slider support body 180 below a front oilless bearing 181 with multiple (two, or right and left) screws 190 extending vertically. The front plate 182 is formed from a metal, and extends in the front-rear and lateral directions. The slider support body 180 holds the front oilless bearing 181 from above. The front plate 182 holds the front oilless bearing 181 from below.

The plates 182 and the screws 190 may be eliminated.

The slider support shaft 183 extends through holes 162 in the right and the left of a lower front portion of the slider support body 180. The slider support 191 is pivotable about the slider support shaft 183.

The springs 184 are located on the right and left of the rear top of the slider support body 180. The springs 184 extend vertically. The upper end of each spring 184 is held on the rear inner surface of the upper power transmission housing 20a.

The bearing 186 is located behind the lower opening in the slider support body 180 and in front of the plate 182. The bearing 186 is a ball bearing.

The inner ring of the bearing 186 is held on the outer surface of the oilless bearing 181. The outer ring of the bearing 186 can be in contact with the cam 98 in the crank cam 78.

The orbital switcher 14 includes an orbital switching lever 192 as an orbital switch.

The orbital switching lever 192 includes a lever body 193 as a shaft and the knob 194.

The lever body 193 is a rod-like shaft extending laterally.

The orbital switching lever 192 is held on the upper power transmission housing 20a in a manner rotatable about the central axis of the lever body 193. The central axis of the lever body 193 is parallel to the plate 182 to be in contact with the lever body 193.

The lever body 193 has a first flat surface 196 and a second flat surface 198. The first flat surface 196 is a support surface extending laterally. The second flat surface 198 is a surface for a second orbital state extending laterally. The first flat surface 196 and the second flat surface 198 are at a predetermined angle (about 100° in this example) to each other. The distance from the central axis to the first flat surface 196 is greater than the distance from the central axis to the second flat surface 198.

In a first orbital state that the orbital is in a first state, the orbital switching lever 192 allows the first flat surface 196 to be in contact with the rear bottom (rear plate 182) of the slider support 191. When the orbital switching lever 192 is in contact with the plate 182, the first flat surface 196 is horizontal, unlike in FIG. 3.

In a second state that the orbital is in a second state as shown in FIG. 3, the second flat surface 198 of the orbital switching lever 192 is horizontal and faces the rear bottom of the slider support 191 across a space. In this case, the bearing 186 in the orbital unit 12 comes in contact with the cam surface 99 of the cam 98 along the entire circumference of the cam surface 99.

In the second orbital state, the bearing 186 comes in contact with the lowest point on the cam surface 99 of the cam 98 under the downward urging force from the springs 184. The second flat surface 198 of the lever body 193 remains separate from the rear bottom of the slider support 191 in this state. This causes the slider support 191, the slider 6, and the blade B to face upward (toward the front).

The bearing 186 also comes in contact with the highest point on the cam surface 99. The bearing 186 is then pushed upward by the cam surface 99 against the urging force from the springs 184, causing the slider support 191, the slider 6, and the blade B to face downward (toward the front). The height of the portion of the cam surface 99 between the lowest point and the highest point in the circumferential direction changes gradually. Thus, rotation of the crank cam 78 moves the bearing 186 up and down as the bearing 186 travels relatively on the cam surface 99. The slider support 191, the slider 6, and the blade B thus repeatedly face upward toward the front, align in the front-rear direction, face downward toward the front, and align in the front-rear direction. This causes an elliptical orbital action of the blade holder 102.

The orbital action is associated with the reciprocation of the slider 6 in accordance with the circumferential distribution of the height of the cam surface 99 in the crank cam 78. When moving forward, the slider 6 faces upward toward the front. When switching the moving direction from forward to backward (or passing near the switching point), the slider 6 aligns in the front-rear direction. When moving backward, the slider 6 faces downward toward the front. When switching the moving direction from backward to forward (or passing near the switching point), the slider 6 aligns in the front-rear direction. The height distribution of the cam surface 99 is adjusted accordingly.

With the slider support 191 and the slider 6 facing either upward or downward, the convex roller 94 allows reciprocation of the slider 6 appropriately.

In the first orbital state, the rear portion of the slider support 191 is lifted by the first flat surface 196 of the lever body 193. The bearing 186 thus does not come in contact with the lowest point and the adjacent portions on the cam surface 99. The slider 6 thus faces less upward toward the front than in the second orbital state. In contrast, the bearing 186 comes in contact with the highest point and the adjacent portions on the cam surface 99.

The bearing 186 comes in contact with the cam 98 on about half the cam 98 and does not come in contact with the cam 98 on the other half due to the first flat surface 196 of the lever body 193. Thus, when moving backward, the slider 6 aligning in the front-rear direction faces downward toward the front, and then aligns again in the front-rear direction (or causes the semielliptical orbital action of the blade holder 102) in the same manner as in the second orbital state. However, when moving forward, the slider 6 remains mostly aligning in the front-rear direction. In the first orbital state, the blade holder 102 thus performs semielliptical orbital action.

In the first orbital state, the blade holder 102 performs orbital action in a range of about half the rotation (first range). In the second orbital state, the blade holder 102 performs orbital action throughout the rotation range (second range), which is wider than the range of about half the rotation (first range).

In the first orbital state, no orbital action may be performed throughout the rotation range. For example, elliptical orbital action may be performed on one-quarter of the rotation and may not be performed on the remaining three-quarters of the rotation. The range in which orbital action is performed (the on-off ratio of orbital action) may be changed in this manner.

Similarly, in the second orbital state, orbital action may not be performed in a part of the rotation range. More specifically, the range in which orbital action is performed may be changed variously with the range of orbital action in the first orbital state (first range) being smaller than the range of orbital action in the second orbital state (second range).

The knob 194 crosses the lever body 193 orthogonally.

The knob 194 is located on the left of the power transmission housing 20 and the cover 22. The knob 194 is exposed outside. The knob 194 is received in the orbital switching lever hole 58 in the cover 22.

The user operates the knob 194 to rotate the orbital switching lever 192 about the central axis. This allows switching between the orbital states.

The guide shoe 16 is located adjacent to the blade B attached to the blade holder 102.

The guide shoe 16 is located in front of and under the slider 6.

The guide shoe 16 includes a shoe plate 200, a shoe supporter 206, and multiple (two) shafts 207.

The shoe plate 200 can be in contact with a workpiece.

The shoe supporter 206 is located above a shoe supporter cover 208. The shoe supporter 206 is located inside the shoe supporter cover 208 in a manner slidable in the front-rear direction. The shoe supporter cover 208 is fixed to the power transmission housing 20. The body housing 2 does not include the shoe supporter cover 208. However, the body housing 2 may include the shoe supporter cover 208.

The shafts 207 are placed on the right and left of the front end of the shoe supporter 206. Each shaft 207 supports the shoe plate 200 in a swingable manner about its axis extending in the lateral direction.

The shoe supporter 206 and the shoe supporter cover 208 each have a U-shaped cross section. The shoe supporter 206 and the shoe supporter cover 208 are located between the outer surface of the lower front portion of the power transmission housing 20 and the inner surface of the lower front portion of the cover 22.

A shoe lever 210 is located outside the shoe supporter cover 208. The shoe lever 210 includes a shoe supporter-fixing shaft 212 that extends in the lateral direction. The shoe supporter-fixing shaft 212 extends above the shoe supporter cover 208 and the shoe supporter 206. The shoe lever 210 is rotatable about the shoe supporter-fixing shaft 212, and operable to be open and closed with respect to the shoe supporter cover 208.

When the shoe lever 210 is closed (extends in the front-rear direction in the figures), the shoe supporter-fixing shaft 212 fastens and fixes the shoe supporter 206. When the shoe lever 210 is open (extends in the vertical direction), the shoe supporter-fixing shaft 212 releases the shoe supporter 206. This allows the shoe supporter 206 and the shoe plate 200 to slide in the front-rear direction to adjust the position of guide shoe 16.

A pin 214 extends vertically behind the shoe supporter-fixing shaft 212. A spring 216 being an elastic member is located between the upper end of the pin 214 and the power transmission housing 20. The lower end of the pin 214 is located on the lower surface of the cover 22. The pin 214 can be raised upon being pushed through the cover 22 against the elastic force from the spring 216.

The pin 214 has a lower portion thinner than its middle portion. When the pin 214 is not raised, the middle portion of the pin 214 interferes with the shoe supporter 206 advancing beyond a predetermined degree, restricting the advancement of the shoe supporter 206 and preventing the guide shoe 16 from being slipped off. When the pin 214 is raised, the interference of the middle portion of the pin 214 with the shoe supporter 206 is eliminated and the guide shoe 16 can be separated from the rest of the reciprocating saw 1.

An example operation of the above reciprocating saw 1 will now be described.

The user attaches the blade B to the blade holder 102 in the slider 6 in an off-state through quick attachment. Typically, the blade B acts onto a workpiece from above. The blade B is thus attached with the edge BE (acting part) facing downward. The blade B may be attached to face upward to, for example, allow the blade B to act onto the workpiece from below.

The user adjusts the length of the guide shoe 16 as appropriate to place the front face of the guide shoe 16 onto a workpiece. The user attaches the charged battery 54 to the battery mount 50. The user operates the speed switching dial 36 to select the speed.

The user then holds the first grip 30 (and the second grip 60) and pulls the trigger 33 by a predetermined amount. This turns on the main switch body 34 and powers the motor 3 to rotate the motor shaft 68. The motor 3 operates on DC power rectified through the control circuit board 42. The lamp 62 turns on in response to the trigger 33 pulled by an amount reaching or exceeding a specified amount. The specified amount is smaller than the predetermined amount set for the motor 3 to be powered.

The microcomputer in the control circuit board 42 obtains information about the rotational state of the rotor 67. The microcomputer in the control circuit board 42 also controls the on-off state of each switching element in accordance with the obtained rotational state, and sequentially applies a current through the coils 66C in the stator 66 to rotate the rotor 67.

The motor shaft 68 rotates at a rotational speed corresponding to a signal (the pulling amount of the trigger 33) from the main switch body 34 in an on-state. The motor shaft 68 rotates at a higher rotational speed in correspondence with a larger pulling amount of the trigger 33. The highest rotational speed of the motor shaft 68 is controlled by the control circuit board 42 in accordance with the rotational state of the speed switching dial 36.

In response to rotation of the motor shaft 68, the crank cam 78 rotates with the bevel gear 70, the torque limiter 72, the countershaft 74, and the crank base 76, causing the slider 6 to move backward and forward. The balancer 170 moves in the direction opposite to the slider 6 in the front-rear direction. The slider 6 thus moves backward and forward with reduced vibrations.

The slider 6 guided by the front and rear oilless bearings 181 is restricted from facing in any direction other than the direction of the slider support body 180.

When the user turns the knob 194 in the orbital switching lever 192 forward (refer to FIG. 2), the second flat surface 198 of the lever body 193 aligns in the front-rear and lateral directions (refer to FIG. 3) and separates from the rear plate 182. The bearing 186 in the orbital unit 12 travels relatively on the entire circumference of the cam surface 99 on the crank cam 78, causing the slider support body 180 to pivot as the slider 6 reciprocates. This causes orbital action throughout the reciprocation of the slider 6 (second orbital state).

When the user turns the knob 194 in the orbital switching lever 192 backward, the first flat surface 196 of the lever body 193 aligns in the front-rear and lateral directions and lifts the rear plate 182. The bearing 186 in the orbital unit 12 travels relatively on simply about half the circumference of the cam surface 99 on the crank cam 78, causing the slider support body 180 to pivot as the slider 6 reciprocates for the half circumference. The bearing 186 does not come in contact with the cam 98 for the remaining about half the circumference, maintaining the posture of the slider support body 180. This causes orbital action for about half the reciprocation of the slider 6 (first orbital state).

As the user lowers the blade B toward a workpiece with the slider 6 or the blade B operating, the edge BE on the reciprocating blade B abuts against the workpiece and cuts the workpiece.

The second orbital state is suitable for a wood workpiece, for example. The first orbital state is suitable for a metal workpiece, for example.

As the fan 4 rotates with rotation of the motor shaft 68, the air around the fan 4 is forced radially outward. Thus, an air flow (blow) is generated in the body housing 2 to cool the various components in the body housing 2.

In particular, the blow partly flows between an upper portion of the power transmission housing 20 and an upper portion of the cover 22 to the vents 169, and then between the upper semicircular arc wall 167U and the wall 168 to split into blow directly downward and blow forward from the bottom of the upper semicircular arc wall 167U. The blow forward travels through the release drum body 140M radially inward.

In response to the user turning off the main switch body 34 by operating the trigger 33, the motor shaft 68 of the motor 3 stops to stop reciprocation motions and blow. The lamp 62 turns off after a predetermined time.

When the user operates the operation tab 150 on the release drum 140 upward when the slider 6 is stopped, the projection 134 on the blade holder 102 moves in an arc through the inner ridge 148. Thus, the blade B attached to the blade holder 102 is detached with an operation on the operation tab 150.

The embodiments and the modifications of the present invention are not limited to those described above. For example, the embodiments and the modifications of the present invention may be further modified appropriately as described below.

Orbital action (trajectory motion) of the blade holder 102 and other components is not limited to elliptical and semi-elliptical motions. For example, the orbital action may include reciprocation along an imaginary semi-elliptical arc (swinging).

The cam 98 may be arc-shaped, linear, or curved as viewed from above. The cam 98 may be located on the lower surface of the crank cam 78. The cam 98 may be separate from the crank cam 78.

At least one of a portion of the reciprocation converter 5, the reciprocation converter 5, or the orbital switcher 14 (orbital switching lever 192) may be located above the slider support 191.

The reciprocation converter 5 may include a crank and a connecting rod (connecting rod type), in place of the crank cam 78 extending in the front-rear and lateral directions (horizontal crank type). In another example, the reciprocation converter 5 may include a rotational member with a sloping cylinder surface and swash bearings on the sloping cylinder surface (swash type).

The cover 22 may be halved into right and left covers.

Needle bearings may be used in place of ball bearings, or ball bearings may be used in place of needle bearings. At least one of the torque limiter 72 or the countershaft 74 may be eliminated. The battery 54 may be attached or detached in a direction other than the front-rear direction. Multiple batteries 54 may be attached. In addition, at least any of the components may be eliminated, or the number of components, their materials, shapes, types, and arrangement may be modified variously.

The tip tool may be any tool other than the blade B.

In place of the battery 54, a cord may be used to supply power. The cord may be connected to utility power.

The embodiments and the modifications of the present disclosure are applicable to reciprocating cutting tools other than the reciprocating saw 1 (e.g., a jigsaw), reciprocating tools other than reciprocating cutting tools, power tools, gardening tools, and electric work machines.

REFERENCE SIGNS LIST 1 reciprocating saw (reciprocating cutting tool)
3 motor
5 reciprocation converter
6 slider
7 release unit
20 power transmission housing
102 blade holder (tip tool holder)
140 release drum (operating drum)
140F flange
140G1, 140G2 groove
142 tension spring (elastic member)
144A, 144B ring spring (ring member)
148 inner ridge
150 projection
160U first upper groove (first groove)
160D first lower groove (first groove)
162U second upper groove (second groove)
162D second lower groove (second groove)
164U first upper cylindrical band (cylindrical band)
164D first lower cylindrical band (cylindrical band)
B blade (tip tool)
BE blade (acting part)

What is claimed is:
1. A reciprocating cutting tool, comprising:
a motor;

a slider being rod-like, the slider extending in a front-rear direction;

a reciprocation converter configured to convert rotation of the motor to reciprocation in the front-rear direction and transmit the reciprocation to the slider;

a power transmission housing accommodating the reciprocation converter;

a tip tool holder at a front end of the slider, the tip tool holder being configured to detachably receive a tip tool; and an operating drum operable to attach or detach the tip tool with the tip tool holder through rotation, the operating drum being rotatably held on the power transmission housing with one or more ring members.

2. The reciprocating cutting tool according to claim 1, wherein the operating drum is operable to detach the tip tool through rotation.

3. A The reciprocating cutting tool according to claim 2, wherein the tip tool holder includes a protrusion, the tip tool is detached or attached from and to the tip tool holder through rotational movement of the projection along an axis extending in the front-rear direction, and the operating drum includes an inner ridge being raised inward, and the operating drum rotates about an axis extending in the front-rear direction to rotate and move the projection with the inner ridge.

4. The reciprocating cutting tool according to claim 2, wherein the one or more ring members are ring springs.

5. The reciprocating cutting tool according to claim 1, wherein the tip tool holder includes a protrusion, the tip tool is detached or attached from and to the tip tool holder through rotational movement of the projection along an axis extending in the front-rear direction, and the operating drum includes an inner ridge being raised inward, and the operating drum rotates about an axis extending in the front-rear direction to rotate and move the projection with the inner ridge.

6. The reciprocating cutting tool according to claim 1, wherein the one or more ring members are ring springs.

7. The reciprocating cutting tool according to claim 1, wherein the operating drum includes a circular groove on an outer surface, and the one or more ring members include a radially inward portion received in the circular groove.

8. The reciprocating cutting tool according to claim 1, wherein the operating drum includes a flange, and the power transmission housing includes a first groove receiving the flange, and a first cylindrical band in contact with the one or more ring members.

9. The reciprocating cutting tool according to claim 8, wherein the first groove and the first cylindrical band are adjacent to each other.

10. The reciprocating cutting tool according to claim 1, further comprising:

an elastic member urging the operating drum to an initial rotational position, wherein the elastic member is located outside the operating drum, and the power transmission housing includes a second groove receiving the elastic member, and a second cylindrical band in contact with the one or more ring members.

11. The reciprocating cutting tool according to claim 10, wherein the second groove and the second cylindrical band are adjacent to each other.

12. The reciprocating cutting tool according to claim 1, wherein the one or more ring members include two ring members.

13. The reciprocating cutting tool according to claim 12, wherein the two ring members are located in a front portion and a rear portion of the operating drum.

14. The reciprocating cutting tool according to claim 1, wherein the one or more ring members each have a width of less than or equal to 4 mm.

15. The reciprocating cutting tool according to claim 1, wherein the tip tool includes an acting part to act on a workpiece, and the tip tool holder receives the tip tool with the acing part facing at least upward or downward.

16. The reciprocating cutting tool according to claim 1, wherein the one or more ring members comprise a metal.

17. The reciprocating cutting tool according to claim 16, wherein the one or more ring members comprise iron or an iron alloy.

18. The reciprocating cutting tool according to claim 1, wherein the operating drum comprises a synthetic resin.

19. The reciprocating cutting tool according to claim 1, wherein the power transmission housing comprises a metal.

20. The reciprocating cutting tool according to claim 19, wherein the power transmission housing comprises aluminum or an aluminum alloy.

* * * * *